(12) United States Patent
Carrasco Vergara et al.

(10) Patent No.: US 10,508,697 B2
(45) Date of Patent: Dec. 17, 2019

(54) FREEWHEEL MECHANISM

(71) Applicant: Rotor Componentes Tecnologicos, S.L., Ajalvir-Madrid (ES)

(72) Inventors: Pablo Carrasco Vergara, Ajalvir-Madrid (ES); Juan Carlos Cambronero Gonzalez, Ajalvir-Madrid (ES); Carlos Miguel Carton Cordero, Ajalvir-Madrid (ES); Enrique Del Rey Fernandez, Ajalvir-Madrid (ES)

(73) Assignee: Rotor Componentes Tecnologicos, S.L., Madrid (ES)

( * ) Notice: Subject to any disclaimer, the term of this patent is extended or adjusted under 35 U.S.C. 154(b) by 0 days.

(21) Appl. No.: 16/084,508

(22) PCT Filed: Feb. 10, 2017

(86) PCT No.: PCT/EP2017/025025
§ 371 (c)(1),
(2) Date: Sep. 12, 2018

(87) PCT Pub. No.: WO2017/167453
PCT Pub. Date: Oct. 5, 2017

(65) Prior Publication Data
US 2019/0072139 A1  Mar. 7, 2019

(30) Foreign Application Priority Data
Mar. 31, 2016  (ES) .................... P201630389

(51) Int. Cl.
*F16D 41/061* (2006.01)
*F16D 41/18* (2006.01)
(Continued)

(52) U.S. Cl.
CPC ............ *F16D 41/32* (2013.01); *B60B 27/047* (2013.01); *F16D 41/061* (2013.01);
(Continued)

(58) Field of Classification Search
CPC ...... F16D 41/061; F16D 41/185; F16D 41/32; F16D 2041/0603; F16D 2127/004; B60B 27/047
See application file for complete search history.

(56) References Cited

U.S. PATENT DOCUMENTS 9,951,828 B2 * 4/2018 Huber .................. F16D 41/32
2015/0354641 A1 * 12/2015 Huber .................. F16D 41/32
192/46

FOREIGN PATENT DOCUMENTS

| CN | 202 484 136 U | 10/2012 |
| DE | 813 815 C | 9/1951 |
| DE | 20 2014 102671 U1 | 9/2015 |

* cited by examiner

Primary Examiner — David R Morris
(74) Attorney, Agent, or Firm — Bay State IP, LLC

(57) ABSTRACT

A freewheel mechanism comprising two coaxial carrying members for eventually transmitting torque there between, being both members axially fixed but rotatably mounted along an axis. This mechanism further comprises longitudinal pawls housed in cavities, predominantly radially disposed in one of the carrying members, arranged to engage and disengage with a toothed ring placed between said carrying members. This mechanism allows a partial declutch of the carrying members, due to said toothed ring is always forced by longitudinal pawls, to slide bi-directionally in the axial direction, being declutching the axial movement from a first clutch position corresponding to non-freewheeling, to a second declutch position corresponding to freewheeling, and being clutching the axial movement of the toothed ring from the second declutch position to the first clutch position.

19 Claims, 15 Drawing Sheets

(51) Int. Cl.
  *F16D 41/32*   (2006.01)
  *B60B 27/04*   (2006.01)
  *F16D 41/06*   (2006.01)
  *F16D 127/00*  (2012.01)
(52) U.S. Cl.
  CPC .... F16D 41/185 (2013.01); *F16D 2041/0603* (2013.01); *F16D 2127/004* (2013.01)

FIG. 1
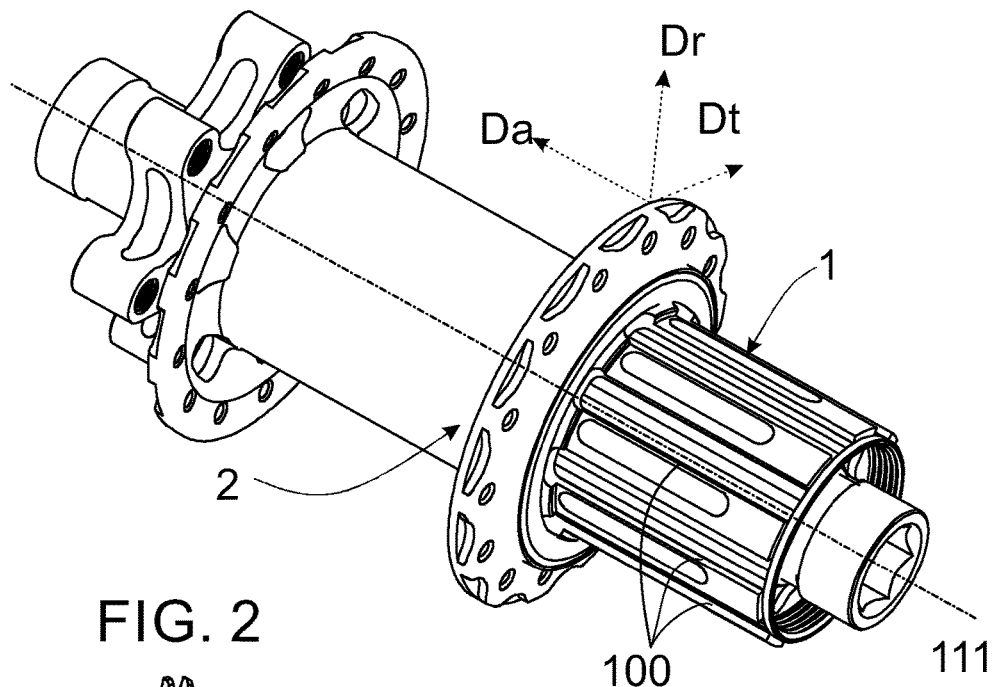
FIG. 2
FIG 3
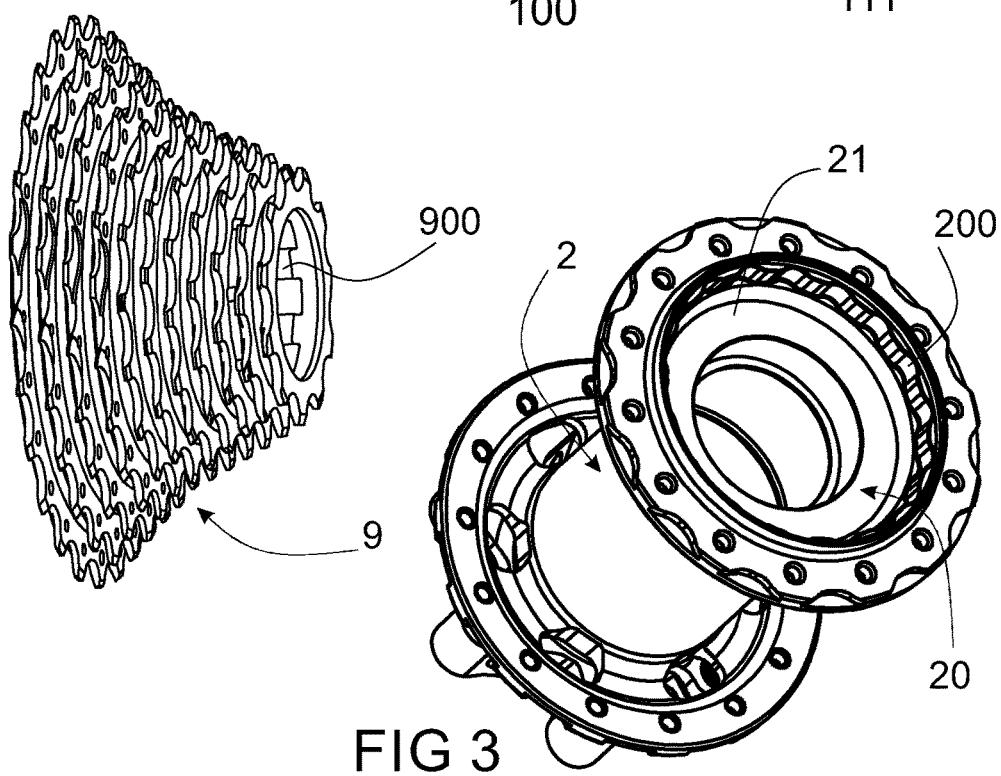

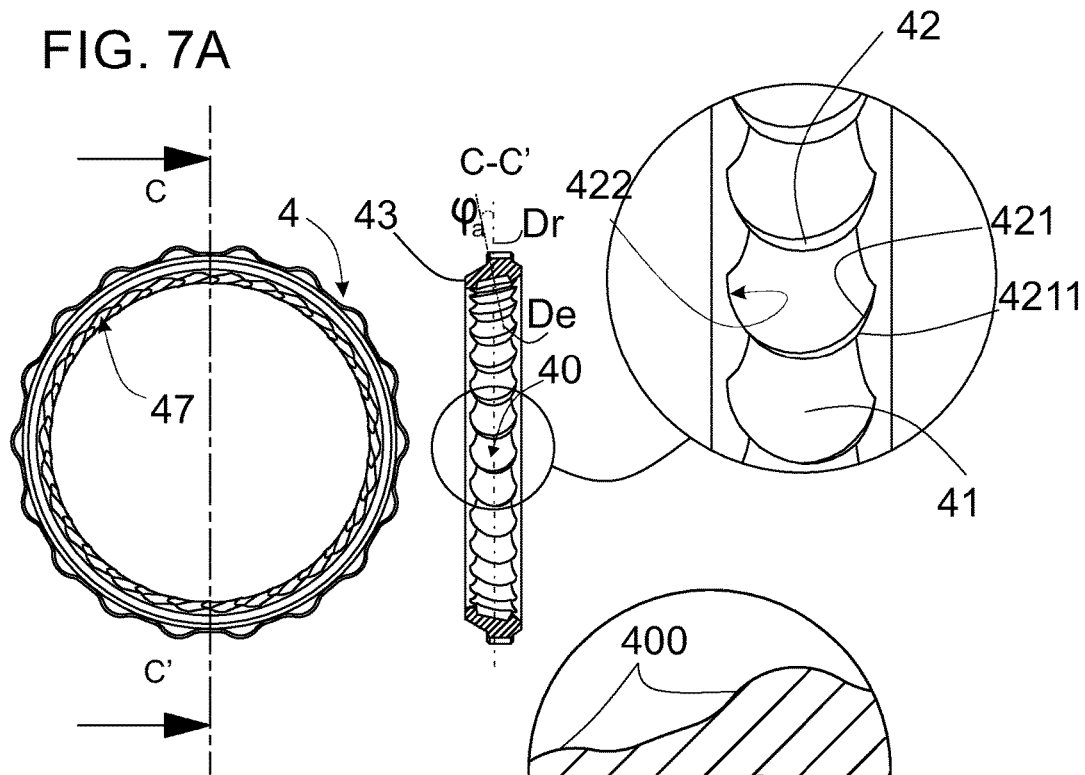
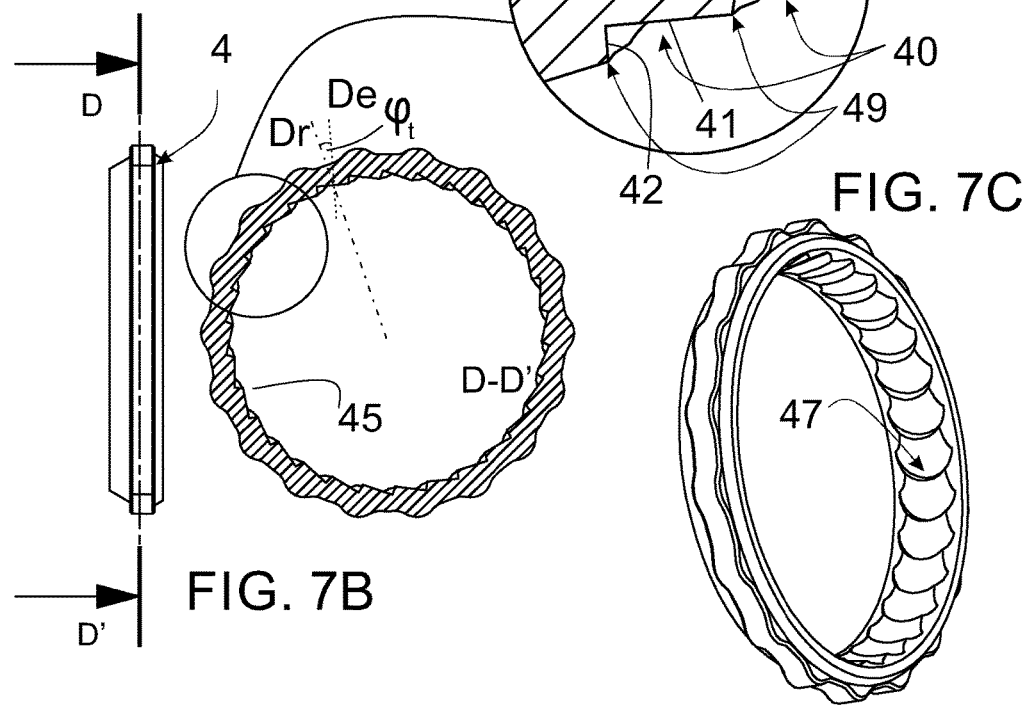
FIG. 7A
FIG. 7B
FIG. 7C

FIG. 14
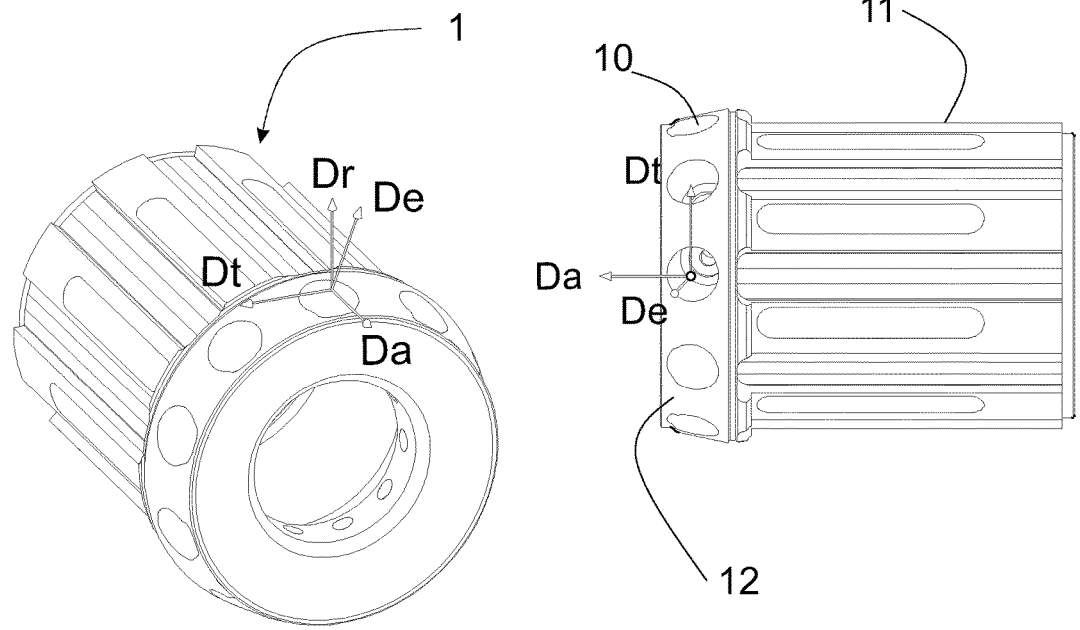
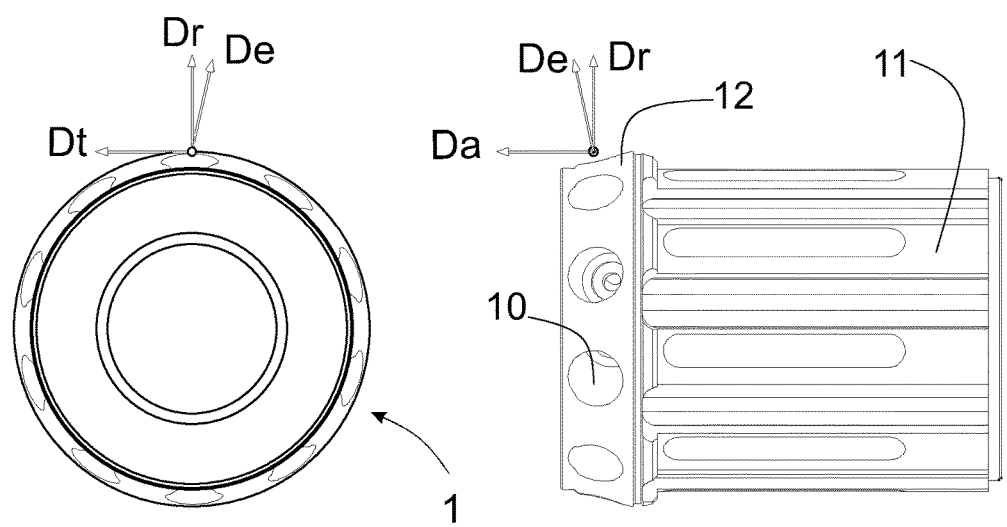

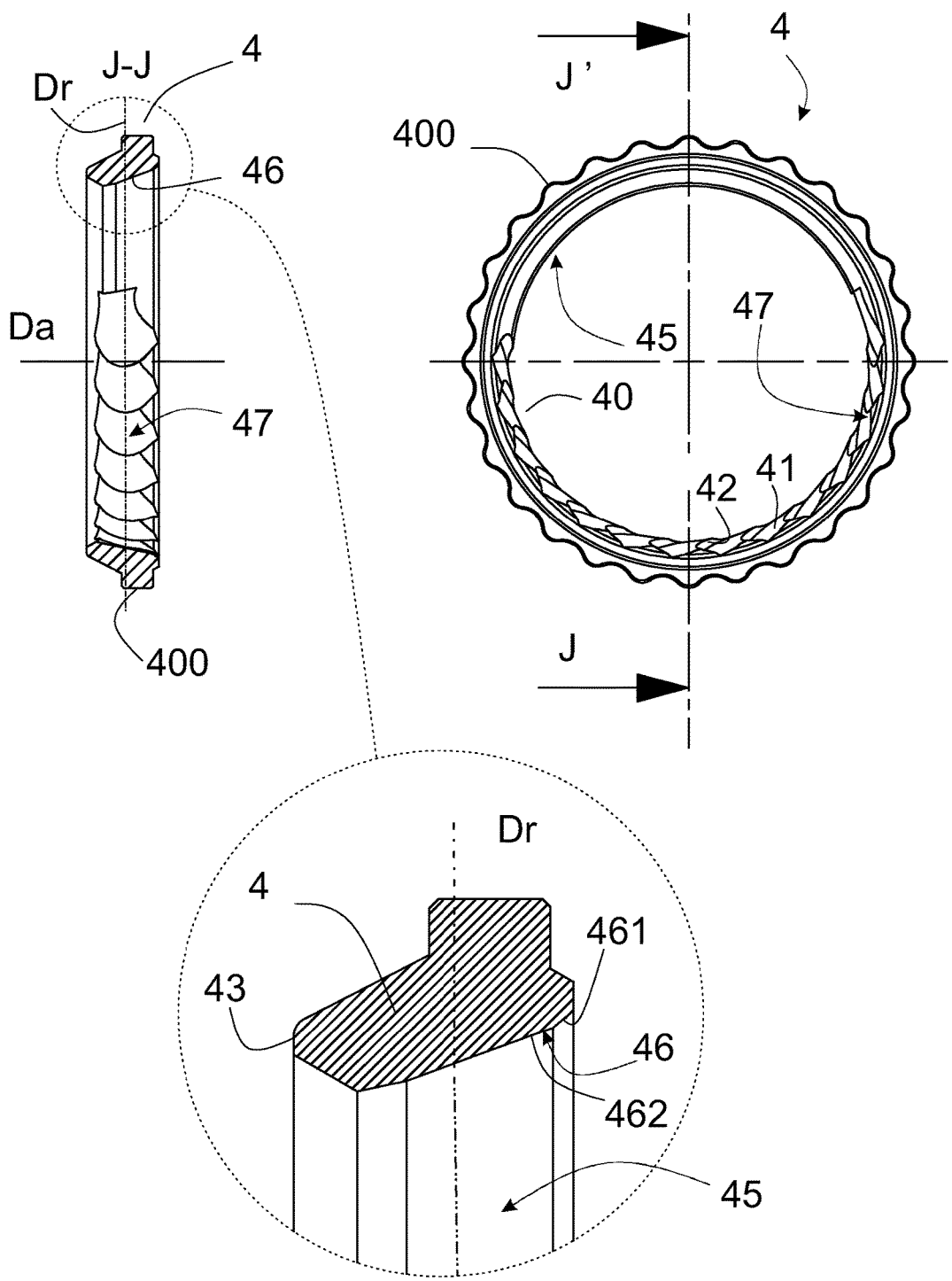

FREEWHEEL MECHANISM

CROSS REFERENCE TO RELATED APPLICATION

This application is for entry into the U.S. National Phase under § 371 for International Application No. PCT/EP2017/025025 having an international filing date of Feb. 10, 2017, and from which priority is claimed under all applicable sections of Title 35 of the United States Code including, but not limited to, Sections 120, 363, and 365(c) and which in turn claims priority under 35 USC 119 to Spanish Patent Application No. P201630389 filed on Mar. 31, 2016.

The present invention relates to rotary drive mechanisms, wherein two coaxial elements rotates in unison in one direction but rotates separately in the opposite direction, being applicable among other fields in wheel hubs, particularly for bicycles. Specifically, the present invention relates to a freewheel mechanism provided with pawls engaging a toothed ring that slides axially, allowing a partial mechanism declutch, reducing both friction and noise when freewheeling. Furthermore, thanks to its simplicity allows to be removed easily for maintenance, without using specific tools.

PRIOR ART

It is widespread used in Mechanics freewheel mechanisms, as in bicycles free-hubs.

In this mechanical application, there are different well known mechanisms: the mechanism with pawls peripherally engaging a toothed ring, as disclosed in U.S. Pat. No. 656,549A; the one including two coaxial toothed discs, the toothed surfaces of which are pressed against each other by a pretensioning device, as shown U.S. Pat. No. 6,588,564B1; and the "one-way bearing", either with balls or rollers, which generally have raceways comprising wedge shaped protrusions in order to generate a narrowing to lock the balls or rollers in said wedges when rotating in one direction, thus the complete bearing acting as a single solid until the direction of rotation is reversed, as disclosed in U.S. Pat. No. 2,843,238A.

These latter freewheels with bearing, as not being based on teeth, are the quietest and usually have the smallest dead stroke, which in this case corresponds to the angle moved by a traction member when moving from freewheeling to torque transmission. However, these mechanisms necessarily involve a very robust construction in order to support the enormous radial forces caused by the wedge effect for achieving a particular tangential force. This robust construction is sometimes an insurmountable penalty when weight and/or volume are great technical limitations such in bicycles.

Freewheels with coaxial toothed discs represent the opposite case, and therefore is widespread used in bicycles, because it is achieved a sufficiently compact and lightweight design, as the engaging forces are predominantly tangential. This device consists of two saw-toothed, spring-loaded discs pressing against each other with the toothed sides together. Rotating in one direction, the saw teeth of the drive disc lock with the teeth of the driven disc, making it rotate at the same speed. If the drive disc slows down or stops rotating, the teeth of the driven disc slip over the drive disc teeth and continue rotating. In order to achieve that spring-load, biasing means must be used, performed by wire springs, magnets or others. So, said device allows at least one of the toothed disc to slide axially. The geometry of tooth surfaces is the key of the mechanism operation, since the thrust face of each tooth must have a slope greater than 90° that facilitates the engagement, forcing the attraction of both toothed discs to full contact remaining locked during torque transmission. Thus, the torque transmission is performed with the entire teeth surface and never only with its end portion, which would cause breakage of the tips of the teeth.

Therefore, a disadvantage of these coaxial toothed discs is a high price because of the difficulty of the manufacturing process to achieve the required quality. In addition, these systems have the largest dead stroke because there are so many divisions per lap as the number of the teeth of the disc. In practice, many teeth are not used to achieve proper engaging and thereby required reliability, therefor in uses of high torque transfer such as bicycles; toothed discs usually have 18 teeth, equivalent to a 20° jump between consecutive engaging positions.

Finally, classical ratchet freewheels are provided with pawls as engagement or locking elements and a toothed ring, whose teeth are arranged along the ring's perimeter. Each tooth has a moderate slope on one face and a much steeper slope on the other face, respectively named slip face and thrust face. This geometry allows the pawl slippage in one direction, but when rotating in the opposite direction, the slope of the thrust face forces the complete engagement of a pawl, so the torque transmission is never made tip-to-tip which would cause breakage of the tips of the elements. This kind of mechanism has advantages and drawbacks shared with both abovementioned types, although it is used in all sorts of applications as it is cheaper to manufacture. In the present case, as a secondary effect of the tangential load, there are internal radial engagement forces, which often cause the breakage of any of the system components.

In this classical freewheel, when pawls are arranged in alternate positions forming two or more engagement groups, the angular increment between consecutive engagement positions and hence the dead angle is reduced: for example, using two couples of pawls (4 units) acting alternately on a 24 teeth toothed ring, the separation between consecutive engagement positions is halved from 15° to 7.5°.

The main disadvantages of this technical solution are derived from the largest diameter and weight of the mechanism due to the radial forces resulting from the torque transmission, and derived as well, from the exposure of the spring that biases the pawls towards the toothed ring. When a single spring breaks due to use, the pieces are scattered inside the mechanism damaging the entire system.

For the sake of simplicity, the present invention will be described in more detail with reference to use on bicycles. Nevertheless, such description should not be construed as limiting the application thereof.

SUMMARY

An object of the present invention is to provide a freewheel mechanism very lightweight and easily assembled and disassembled for maintenance, in which noise, friction and teeth abrasion can be reduced during freewheeling with respect to a conventional freewheel mechanism. This freewheel mechanism comprises two coaxial main members for eventually transmitting torque there between, being both main members axially fixed but rotatably mounted to an axle. This freewheel mechanism further comprises longitudinal pawls engaging a toothed ring which is placed between said main members, being this toothed ring movably mounted in same axial direction. Another object of the present invention is said freewheel mechanism particularly applicable to a bicycle hub.

This freewheel mechanism has a one-way function whereby it only allows free relative rotation between said main members in one direction (freewheeling direction), but when rotating in the opposite relative direction (non-freewheeling or driving direction) said two main members become to rotate together and then there is torque transmission.

One of said main members is called first carrying member (1), and the other one, second carrying member (2). Arranged between both main members, the second carrying member (2) houses and is coupled to a toothed ring (4) which rotates always jointly with the second carrying member (2) but can slide axially in order to partially declutch the mechanism.

The first carrying member (1) comprises, in its adjacent area to the second carrying member (2), a plurality of longitudinal cavities (10) peripherally disposed, for housing and guiding longitudinal pawls (3). Each longitudinal pawl (3), which is pin shaped, slides along its own longitudinal axis (37) into the corresponding longitudinal cavity (10), in order to engage or disengage with a toothed member (47) provided in the toothed ring (4).

Said toothed ring (4) can slide axially between a first clutch position, corresponding to non-freewheeling, and a second declutch position. This axial displacement of the toothed ring (4) is named floatability. During freewheeling the toothed ring (4) stays placed in the second declutch position, reducing noise, friction and teeth abrasion.

Each carrying member (1 and 2) can be reciprocally driving or driven member in the mechanism. For the sake of clarity in explanation, from now on we consider the driving member is the first carrying member (1), and the driven member is the second carrying member (2). Regarding the relative rotation between both members, we consider the second carrying member (2) rotates respect to the first carrying member (1), as coasting in a bicycle.

For each point in the system, the main directions of operation of this freewheel mechanism are defined as following: the axial direction (Da) corresponds to the rotation axis (111); the radial direction (Dr) is the radius defining each point position; and the tangential direction (Dt) is orthogonal to the previous two, forming a clockwise trihedral. It is defined the positive of these directions as following:

Positive axial direction (Da) is the second carrying member (2) rotation direction when freewheeling.

Positive radial direction (Dr) is outwardly from the rotation axis (111).

Positive tangential direction (Dt) is the one forming a clockwise trihedron with previous Da and Dr, and it corresponds with the local speed direction when freewheeling.

Each longitudinal pawl (3) is pin shaped and is forced in its longitudinal axis (37) direction against the toothed member (47) by biasing means (5), either via torsion spring or other resilient members, magnets, pneumatic pressure, or other means.

Each longitudinal pawl (3) comprises, in its end adjacent to the toothed member (47), an engage member (33) which is provided with a thrust face (332), laterally disposed, and a slip face (331) orthogonal to the pawl longitudinal axis (37). Said engage member (33) faces outwardly from a longitudinal cavity (10), in order to come into contact with the toothed member (47).

Each of the longitudinal pawls (3) further comprises a guiding member (34) which has an outer section mating the inner section of the longitudinal cavities (10). Therefore, a longitudinal cavity (10) houses the corresponding longitudinal pawl (3) securing the pawl longitudinal axis (37) position along an interlocking direction (De), allowing the pawl (3) to slide in that direction.

This interlocking direction (De) has fixed values for its coordinates ($De_a$, $De_r$, $De_t$) in the abovementioned local Da-Dr-Dt trihedron. So it is defined, for each longitudinal cavity (10), a local interlocking direction (De) with identical values for the axial, radial and tangential components in said local Da-Dr-Dt trihedron, therefore the set of different interlocking directions (De) corresponding to all longitudinal cavities (10), conform the straight generators of a hyperboloid of revolution.

The interlocking direction (De) has a predominant radial component to facilitate traction as the torque transmission is due to tangential thrust force between the longitudinal pawls (3) and the toothed member (47), more specifically between the engage member (33) which pushes laterally via the thrust face (332) against the toothed member (47). Furthermore, the tangential component of said interlocking direction (De) corresponds with the teeth sliding slope of the toothed member (47), which is small enough to allow the longitudinal pawls (3) slip over the toothed member (47) when freewheeling. Furthermore, the interlocking direction (De) has an axial component big enough so that facilitates the toothed ring (4) to slide axially, as a result of the toothed member (47) is pushed by the longitudinal pawls (3) in said interlocking direction (De) biased by the biasing means (5), thus allowing the toothed ring (4) declutching.

The second carrying member (2) has a peripheral surface with a first torque load transmitting member (200) mating with a second torque load transmitting member (400) arranged in a peripheral surface of the toothed ring (4). These members allow both elements to jointly rotate but allowing the toothed ring (4) to slide axially with respect to the second carrying member (2). Said axial displacement is limited by an axial restriction member (21) that determines the second declutch position. The freewheel mechanism is configured so that, while driving by a thrust force applied from the first carrying member (1), the toothed ring (4) transfer torque to the second carrying member (2) via the second torque load transmitting member (200) (400) engaging the first torque load transmitting member (200).

The toothed ring (4) comprises, in the contact area with the longitudinal pawls (3), a toothed member (47) provided with a plurality of recesses (40), forming teeth (49) peripherally arranged. Each recess (40) comprises two main surfaces: the slip surface (41) located at the bottom of the recess (40) and the lateral surface (44). This lateral surface (44) further comprises an outer side surface (421), a thrust surface (42) and an inner side surface (422), forming a concave surface according the positive tangential direction (Dt).

This thrust surface (42) delimits the slip surface (41) in the positive tangential direction (Dt) and is flanked by the outer side surface (421) and the inner side surface (422), this latter being positioned in the increasing axial direction (Da).

In each recess (40) the outer side surface (421) is radially delimited between the slip surface (41) and an outer side edge (4211). This outer side edge (4211) begins in the cutting edge of the slip surface (41) of the preceding recess (40) and ends approximately in the middle of the slip surface (41) of the corresponding recess (40).

This teeth (49) may be executed with a peak section, so when consecutive recesses (40) overlap, each recess slip surface (41) finish in the thrust surface (42) of the following recess in the freewheeling direction.

In each recess (40), the thrust surface (42) mates with the thrust face (332) of the engage member (33) of the corresponding longitudinal pawl (3) engaged in said recess (40) when non-freewheeling, so the thrust surface (42) secure the tangential support of the corresponding pawl (3).

Moreover, the slip surface (41) of each recess (40) is substantially orthogonal to the interlocking direction (De) of the corresponding longitudinal pawl (3) engaged in said recess (40) when non-freewheeling. In addition, in a preferred embodiment, a non-zero value of the interlocking direction axial component ($De_a$) greatly facilitates manufacturing of the toothed member (47) arranged in the toothed ring (4) internal periphery.

Biasing means (5) force each longitudinal pawl (3) against the toothed member (47) in its corresponding interlocking direction (De) resulting in a biasing load. The sum of biasing loads applied with all the longitudinal pawls (3), in the radial, tangential and axial components of the interlocking direction (De), produce the following effects on the whole freewheel mechanism of the invention:

The sum of radial biasing loads is zero, as the radial components are offset with each other.

The sum of tangential biasing loads generates a resultant torque on the toothed member (47) forcing it to engage with the thrust faces (332) of the engage members (33).

The sum of axial biasing loads force axially the toothed member (47) and therefore the toothed ring (4) to the second declutch position.

It is understood from the above mentioned, that the resultant of the axial biasing loads have an effect opposite to the resultant of the tangential biasing loads, thus partially offsetting between them. As a result, the total biasing load is reduced in comparison to the conventional freewheel mechanisms present in the Prior Art.

Once it is described the geometry of the components forming the mechanism of the invention, it is described its operation into four separated working states: non-freewheeling (E1), declutching (E2), freewheeling (E3) and clutching (E4).

The system variables are considered the following:

($\Omega$)=angular velocity of the second carrying member (2) with respect to the first carrying member (1), being positive in the freewheel rotation, called forward.

(Fd)=floating distance. It is the axial distance from the first clutch position to the instantaneous position of the toothed ring (4). This floating distance varies in the range between 0 and a maximum floating distance (FdM), respectively corresponding to states of non-freewheeling (E1) and freewheeling (E3). Therefore, the maximum floating distance (FdM) is the distance between the first clutch position and the second declutch position, being this latter position determined by the axial restriction member (21).

Non-Freewheeling State (E1):

Geometrically in this state, the toothed ring (4) is located in the first clutch position, which is the axial position corresponding to zero floating distance (Fd) value, and zero angular velocity ($\Omega$): Fd=0; $\Omega$=0.

In this state, at least one engage member (33) and preferably each one of them, is fully mesh at the bottom of a thrust surface (42) in the toothed member (47). That is, the engage member (33) of this pawl (3) is partially enclosed by the thrust surface (42) of one of the recesses (40), thus being supported in the tangential direction at the bottom of said thrust surface (42), and the slip face (331) is as well, in contact with the slip surface (41) of said recess (40).

As a consequence the longitudinal pawls (3) and the toothed ring (4) move jointly, and obviously the first carrying member (1) and the second carrying member (2) moves jointly in turn, thus transmitting torque between both carrying members.

Declutching State (E2):

Geometrically in this in-between state, the floating distance (Fd) increases from 0 to the maximum floating distance (FdM), while the relative angular velocity ($\Omega$) of the second carrying member (2) is positive: $\Omega>0$.

This is a transitory state, when there is no torque transmission and freewheel begins, changing from the non-freewheeling state (E1) to the freewheel state (E3). It is the beginning of the relative rotation movement between both carrying members (1, 2).

Therefore, the previously engaged thrust surfaces (42) begin to move away in the tangential direction from the corresponding longitudinal pawls (3). However, there is still contact between the slip face (331) of each pawl's engage member (33) and the slip surface (41) of the recess (40) in which each engage member (33) was meshed in the previous state (E1), due to the action force of the biasing means (5). Consequently, the toothed ring (4) is axially biased to slide away from the meshing position with the longitudinal pawl (3), which is to say in the increasing direction of the floating distance (Fd). At the beginning of this Declutching State (E2), the toothed ring (4), and therefore the toothed member (47), begins to slide axially but it remains still axially limited by the pawl's engage member (33) contacting the outer side surface (421) of said recess (40), whereby the toothed ring (4) describes an unscrewed or helical movement, which combines a rotation with a simultaneous axial displacement, until the engage member (33) is no longer enclosed by said outer side surface (421). In this moment, the toothed ring (4) slides axially away from the first carrying member (1) until reaching the maximum floating distance (FdM), position that corresponds with the contact between the axial restriction member (21) and the toothed ring (4), thus ending the declutching state (E2).

In a preferred embodiment of the mechanism of the invention, the inner side surface (422) of each recess (40) is lateral ramp shaped, so in the declutching process when the toothed ring (4) rotates and moves forward in the tangential direction, said inner side surface (422) is guided by the engage member (33) in contact, thus helping to force axially the toothed ring (4). Therefore, each inner side surface (422) being in contact with the corresponding engage member (33), forces the toothed ring (4) to slide axially in case the resultant axial biasing load corresponding to biasing means (5) becomes insufficient, either due to loss of lubrication, dirt accumulation or other reasons that may cause a greater friction in the axial displacement, or due to a significant decrease in the total force exerted by biasing means (5). This preferred embodiment is named toothed ring (4) with guided floatability.

Freewheeling State (E3):

Geometrically, the toothed ring (4) stays in the second declutch position, corresponding to Maximum Floating distance (FdM), so Fd=FdM, and the relative angular velocity ($\Omega$) of the second carrying member (2) remains positive: $\Omega>0$.

In this state, the toothed ring (4) rotates so the toothed member (47) slides over the slip face (331) of each pawl's engage member (33), and therefore each longitudinal pawl (3) moves repeatedly in and out in its respective longitudinal cavity (10) with every passing tooth (49) against the action of biasing means (5). But the most important difference when freewheeling, compared with the known ratchet-pawls mechanisms in the Prior Art, is the declutch function due to the axial floatability of the toothed ring (4), thus resulting the longitudinal pawls (3) are no longer facing the thrust surface (42) of the recesses (40). So, when the slip face (331) of the pawl's engage member (33) loses contact with the slip surface (41) of a certain recess (40), the longitudinal pawl (3), instead of jumping directly into the next recess (40), first slides down onto the outer side edge (4211) of the next recess (40); and then, when losing the support of this outer side edge (4211), after a much smaller jump, comes into contact with the slip surface (41) of this next recess (40).

Therefore, this novel declutch function of the toothed ring (4) results in a geometrical buffering of the impacts between components in the present freewheel mechanism. So, this provides the present freewheel mechanism with the following advantages: the noise caused when the longitudinal pawls (3) impacting with the successive recesses (40) when freewheeling are reduced; as a consequence of the axial distance of the toothed ring (4) from the clutch position, the teeth (49) are away from the longitudinal cavities (10), reducing the inward stroke of the longitudinal pawls (3) into the cavities (10), hence reducing the corresponding biasing load; furthermore, as the longitudinal pawls (3) goes sliding down onto the outer side edge (4211) of the recesses (40), there are no longer contact with the bottom of the recesses (40), reducing the outward stroke of the longitudinal pawls (3) out of the cavities (10), therefore reducing the energy needed against the biasing means (5).

In other words, in a conventional mechanism, the pawls go jumping from tooth to tooth in a stepped way, but in the mechanism of the invention there is an intermediate ramp that softens that jumping impact, also limiting the in and out longitudinal pawl (3) movement, thus decreasing the friction, noise, abrasion and biasing means (5) energy consumption.

Clutching State (E4):

Geometrically in this in-between state, the relative angular velocity ($\Omega$) of the second carrying member (2) is negative: $\Omega<0$, while the floating distance (Fd) decreases from the maximum floating distance (FdM) to 0.

This is a transitory state when the mechanism changes the rotation direction, switching from the freewheeling state (E3) to the non-freewheeling state (E1). The relative angular velocity ($\Omega$) of the second carrying member (2) remains negative until the non-freewheeling state (E1) when both carrying members (1, 2) will move jointly for transmitting torque.

In the beginning of the clutching state (E4), as the longitudinal pawls (3) slide onto the toothed member (47), each slip face (331) of the pawl's engage member (33) may be only in one of these two contact situation: either with its slip face (331) contacting, with the outer side edge (4211) of a recess (40), or with its slip face (331) contacting with the slip surface (41) of a recess (40).

In the first contact situation, the toothed ring (4) rotates backwards, while said longitudinal pawl (3), sliding over the outer side edge (4211), goes inwards into its housing, in a negative interlocking direction (De), moving against the biasing means (5). This contact situation remains until the toothed ring (4) rotation produce the contact between the slip face (331) and the slip surface (41) of the next recess (40) going backward. In this moment, the longitudinal pawl (3) reaches the deepest position into its housing in a cavity (10), and then begin the second contact situation.

In this second contact situation, the toothed ring (4) continues rotating backwards, while each pawl's engage member (33) slides over the slip surface (41) of a recess (40), and each longitudinal pawl (3) goes outwards in its corresponding interlocking direction (De) out of a longitudinal cavity (10). In a moment, called engaging start instant ($E4_e$), the pawl's thrust face (332) contacts with the outer side surface (421) of said recess (40), and it appears a force orthogonal to the outer side surface (421) producing an axial load on the toothed ring (4). As the toothed ring (4) continues rotating backward and the pawl's thrust face (332) remains in contact with the outer side surface (421), said axial load biases the toothed ring (4) to slide axially resulting in a screwed effect, whereby the toothed ring (4) describes a helical movement, which combines the rotation with a simultaneous axial displacement.

The maximum floating distance (FdM) must be therefore small enough, preferably in the range 10%-20% of the longitudinal pawl (3) transversal dimension, to enable the outer side surface (421) to embrace partially the pawl's thrust face (332) as described for the engaging start instant ($E4_e$).

Once it is secured at least one longitudinal pawl (3) full meshing at the bottom of the recess (40), when its engage member (33) is in contact with the slip surface (331) and simultaneously with the thrust surface (42), this clutching state (E3) finishes enabling to switch to non-freewheeling state (E1).

In known ratchet-pawl freewheel mechanisms of the Prior Art, the interlocking of the pawls with the teeth happens in the in-between state from freewheeling to non-freewheeling, and it is due to the biasing loads and to the specific slope of the teeth's thrust surfaces which contact with the corresponding pawl surfaces.

Nevertheless, in the freewheel mechanism object of the invention, the interlocking of the longitudinal pawls (3) with the teeth (49) happens in the in-between state from freewheeling to non-freewheeling, the clutching state (E4), and it is due to the biasing loads and to the axial floatability of the toothed ring (4), that makes possible the fully meshing of the engage member (33) at the bottom of the recess (40) in the non-freewheeling state (E3).

In both mentioned mechanisms, only the biasing mean would be insufficient to fully mesh a pawl if non-freewheeling begin when the pawl is changing from one recess to the next one. In that case, pawls and teeth could be engaged just on their tips, and would cause in case of transmitting a high torque, the breakage of the pawl and teeth tips, and consequently breaking the mechanism. Therefore, it is needed a geometrical solution (either the known pawl slope, or the invented axial floatability of the toothed ring) to allow the torque forcing the full mesh.

Moreover, as in the present freewheel mechanism tangential forces are the predominant loads for transmitting torque, a very lightweight mechanism is achieved.

Compared with ratchet and pawls freewheel mechanisms anticipated in the state of the art, the present freewheel mechanism can be more easily assembled and disassembled due to the axial floatability of the toothed ring (4) and the simplicity of the longitudinal pawls (3). This is an additional important advantage particularly in maintenance.

BRIEF DESCRIPTION OF THE DRAWINGS

FIG. 1 shows a bicycle freewheel mechanism object of the invention, comprising two coaxial main members axially fixed but rotatably mounted to a rotation axis (111), which are a first carrying member (1) and a second carrying member (2). It is also shown a local Cartesian coordinate system comprising its three orthogonal directions: axial direction (Da) parallel to the rotation axis (111), radial direction (Dr) and tangential direction (Dt).

FIG. 2 shows a rear sprocket assembly (9) that drives the first carrying member (1) through corresponding sprocket engaging means (900).

FIG. 3 shows a perspective view of the second carrying member (2) of FIG. 1 with a first torque load transmitting member (200).

FIGS. 7A-7B and 7C show different views, sections C-C', D-D' and details of one embodiment of the toothed ring (4); wherein the teeth (49) of the toothed member (47) are formed by overlapping adjoining recesses (40). It is also disclosed the main parts of each recess (40): the slip surface (41) and the thrust surface (42). It is also disclosed both side surfaces of the thrust surface (42): the outer side surface (421) and the inner side surface (422); and the outer side edge (4211) of said recess (40) corresponding to said outer side surface (421). It is also shown an axial abutment member (43) delimiting in this embodiment the axial sliding of the toothed ring (4) when coming into contact with a corresponding axial restriction member (21) of the second carrying member (2).

FIG. 14 shows different views of the first carrying member (1) with longitudinal cavities (10) for housing the longitudinal pawls (3), with a local Cartesian coordinate system corresponding to a cavity (10) formed by three orthogonal directions: axial direction (Da), radial direction (Dr) and tangential direction (Dt). It is also shown the local interlocking direction (De) corresponding to said cavity (10).

FIG. 17 shows a detail view section of the toothed ring (4) in mid-process machining disclosed in FIG.16 showing the inner opening (45) comprising a revolution surface (46).

DETAILED DESCRIPTION OF PREFERRED EMBODIMENT

Figure 4A:
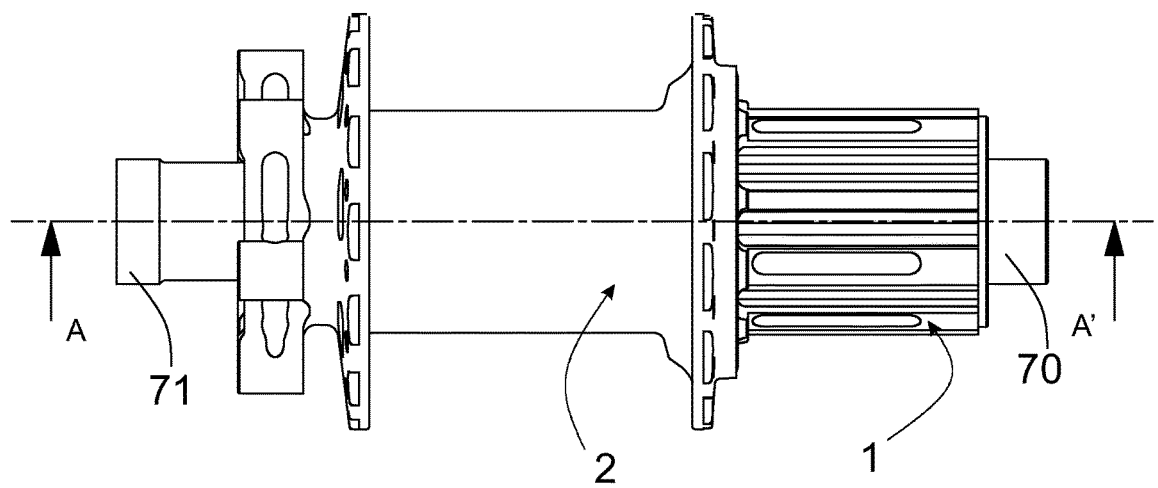
FIGS. 4A and 4B show respectively a side view and the A-A' section of the FIG. 1 freewheel, revealing the first carrying member (1), the second carrying member (2) and a toothed ring (4) disposed between them, where longitudinal pawls (3) mesh forced by biasing means (5). It is also shown the axle assembly (7), the bearings assemblies (81, 82) and an axial restriction member (21), axially limiting the toothed ring (4) sliding, when it contacts with an axial abutment member (43). It is also shown the declutching direction (D2) and the clutching direction (D1) corresponding to the axial sliding of the toothed ring (4).
Figure 4B:
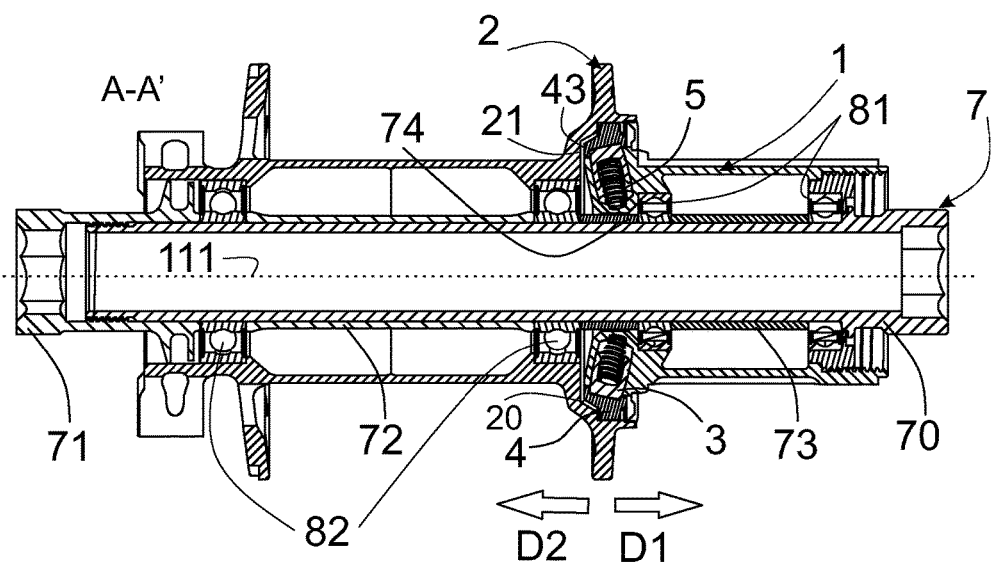
Figure 5A:
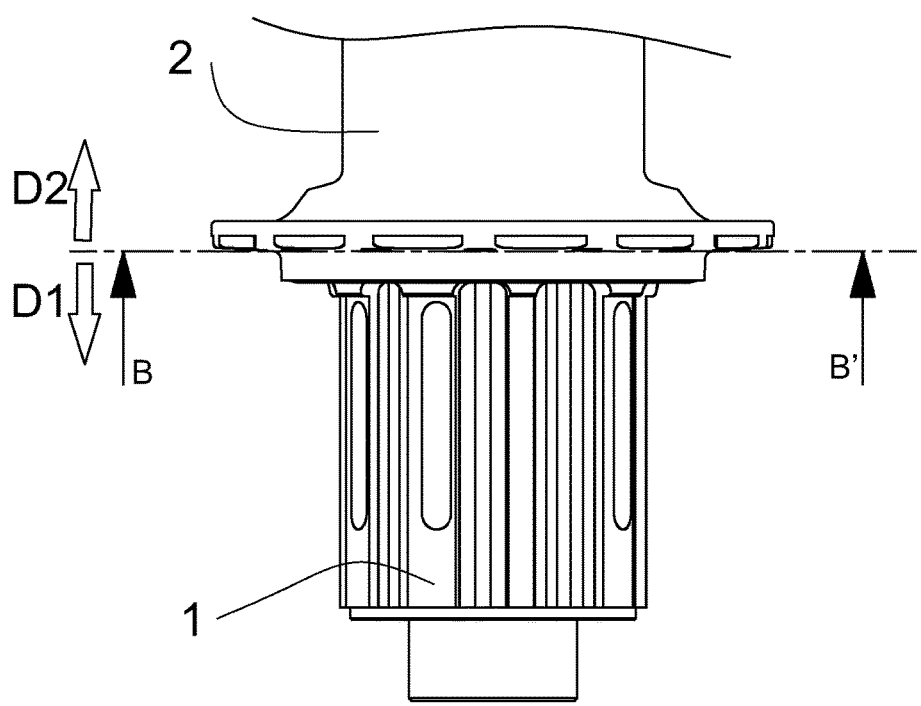
FIGS. 5A and 5B respectively show a front view and the B-B' section of the FIG. 1 freewheel. In this latter section, it is shown the toothed member (47) for meshing and sliding with the longitudinal pawls (3). It is also shown the cavities (10) arranged in the first carrying member (1) to house the pawls, and the biasing means (5) which force in the interlocking direction (De) the longitudinal pawls (3) towards the toothed ring (4).
Figure 5B:
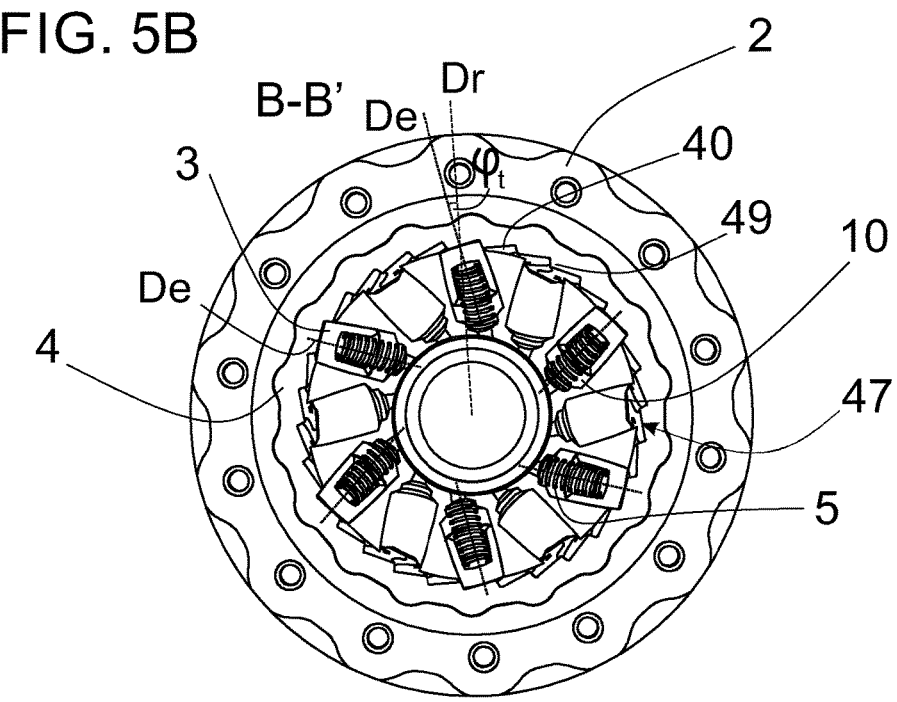
Figure 6:
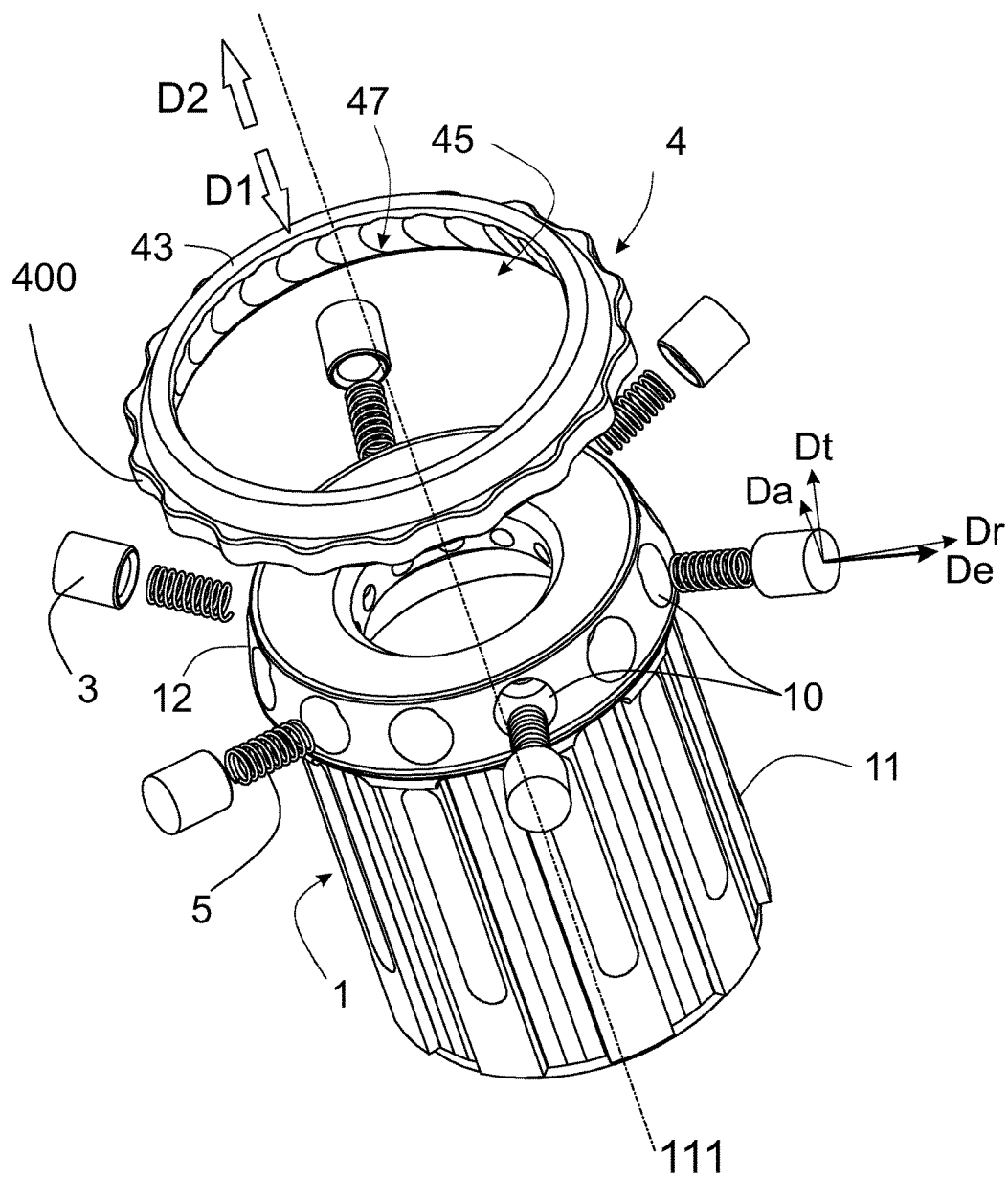
FIG. 6 shows an exploded perspective view of the first carrying member (1) comprising a tubular member (11) and a drum member (12), the toothed ring (4) comprising an inner opening (45) and a second torque load transmitting member (400) to drag the second carrying member (2), longitudinal pawls (3) forced by biasing means (5) and the cavities (10) housing said longitudinal pawls (3).
Figure 8A:
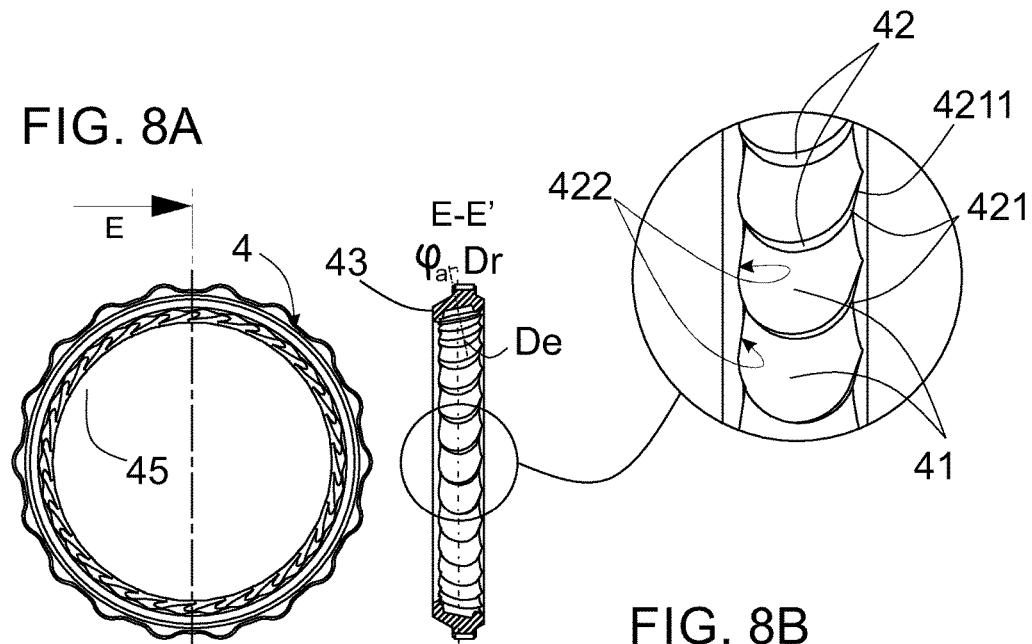
FIGS. 8A and 8B and 8C show different views, sections E-E', F-F' and details of an alternative embodiment wherein the toothed ring (4) is provided with guided floatability, disclosing the toothed member (47), the slip surface (41) and the thrust surface (42) of each recess (40), the outer side surface (421), the inner side surface (422) and the outer side edge (4211).
Figure 8B:
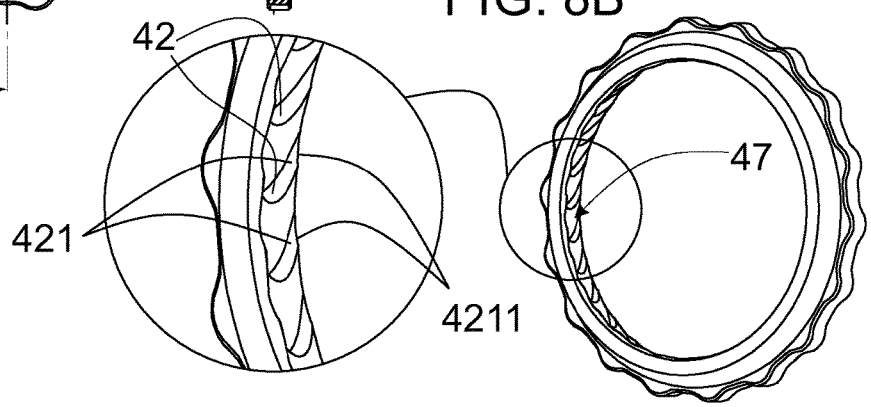
Figure 8C:
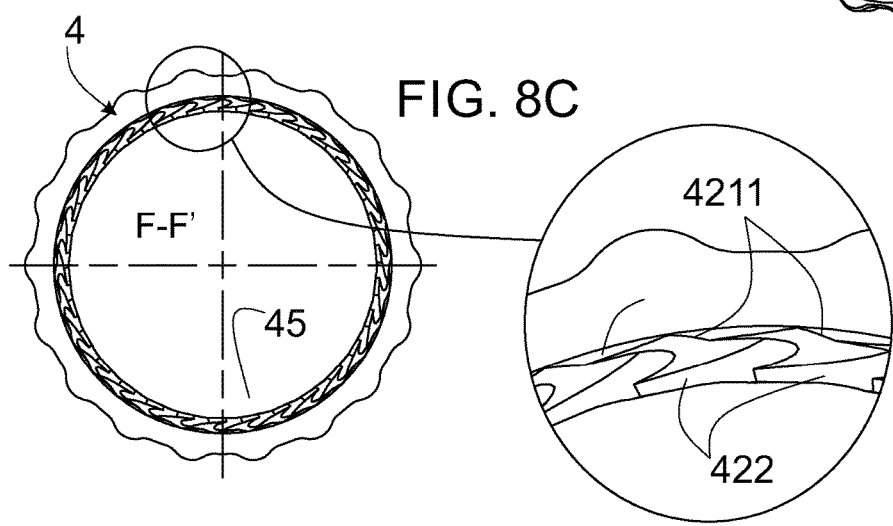
Figure 9:
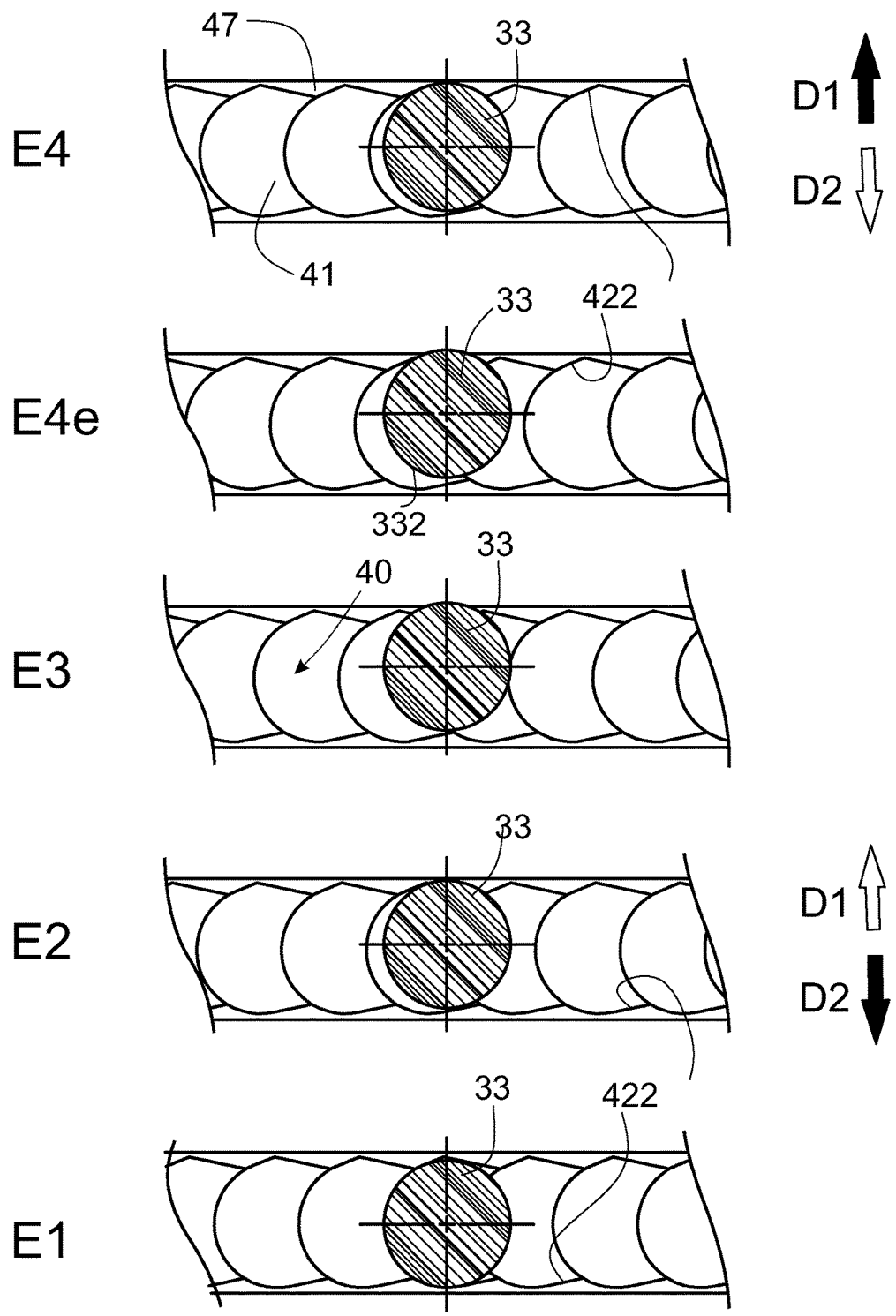
FIG. 9 shows the four different working states E1, E2, E3, E4 with schematic sections of the FIG. 5 mechanism, describing the operation of the mechanism object of the invention, showing for each state, the different positions of the engage member (33) and the toothed member (47) that slides axially in the declutching direction (D2) during E2, from E1 to E3, and in the opposite direction, clutching direction (D1), during E4, from the engaging start instant E4$_e$ to E1.
Figure 10:
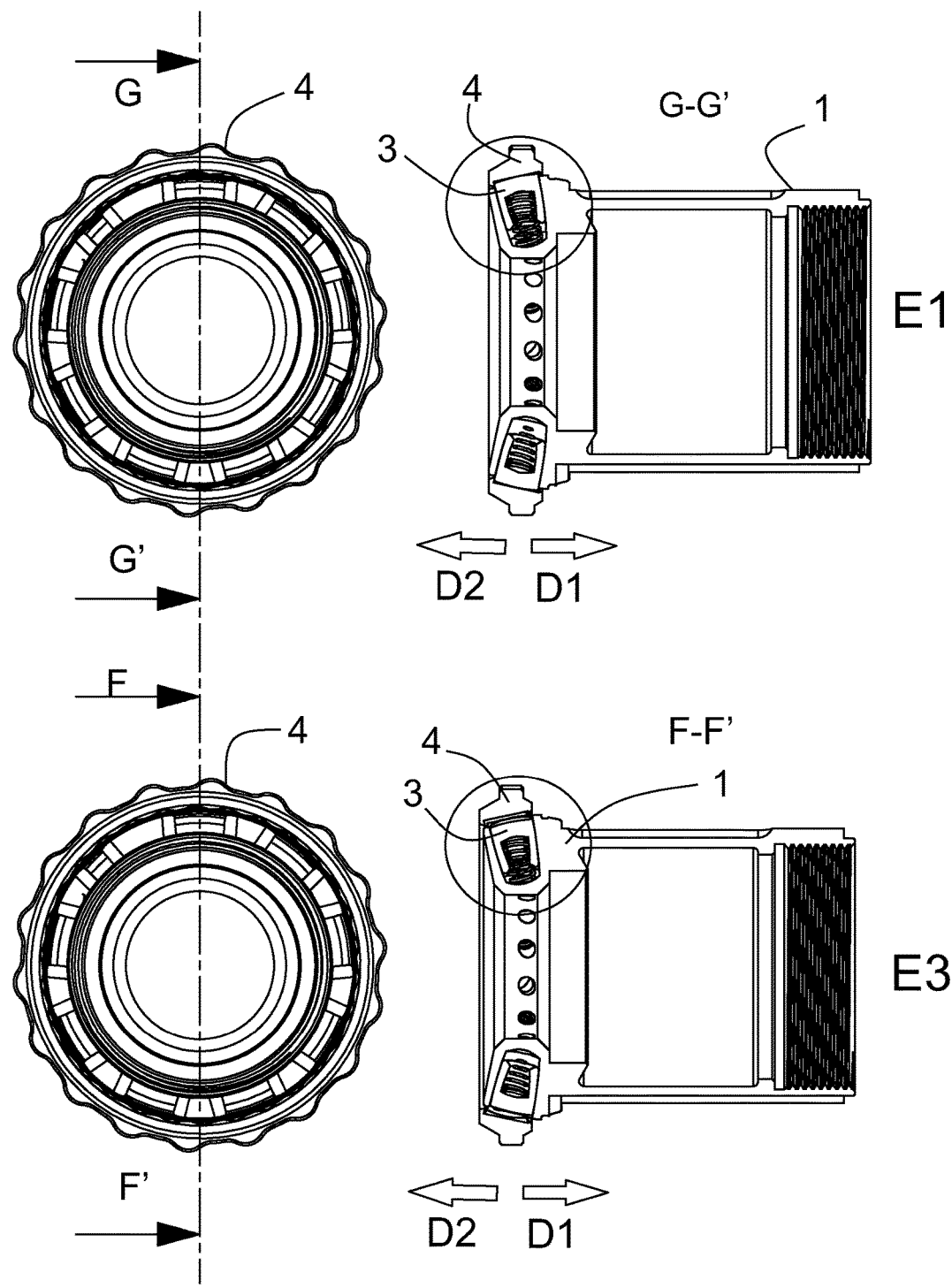
FIG. 10 shows a two sections of the FIG. 5 mechanism: G-G' corresponding to the non-freewheeling state (E1) and F-F' corresponding to the freewheeling state (E3).
Figure 11:
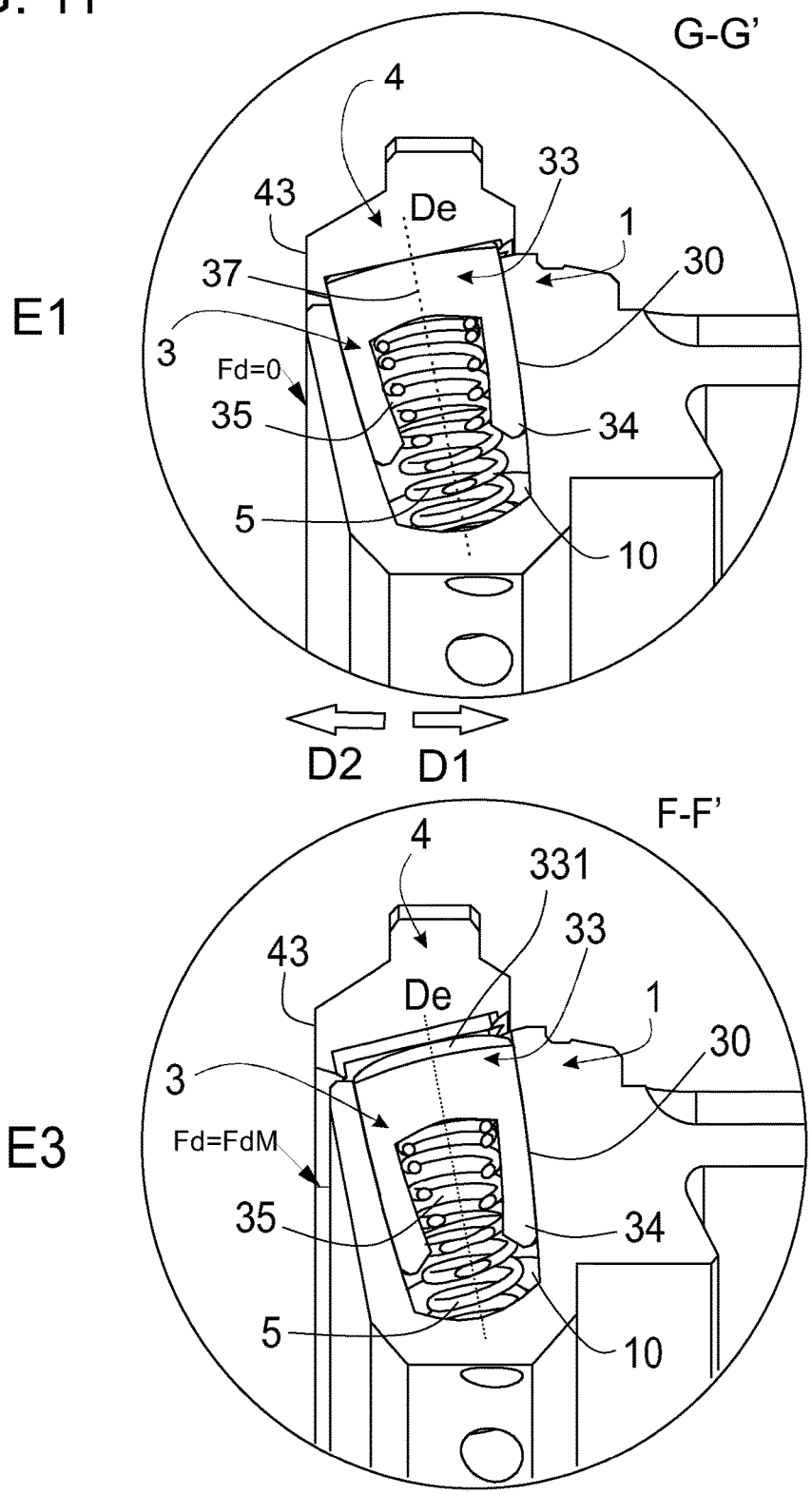
FIG. 11 shows the detail of the two operating states of FIG. 10, non-freewheeling state (E1) and freewheeling state (E3). It is also shown an engage member (33) with a slip face (331) orthogonal to the pawl longitudinal axis (37).
Figure 12:
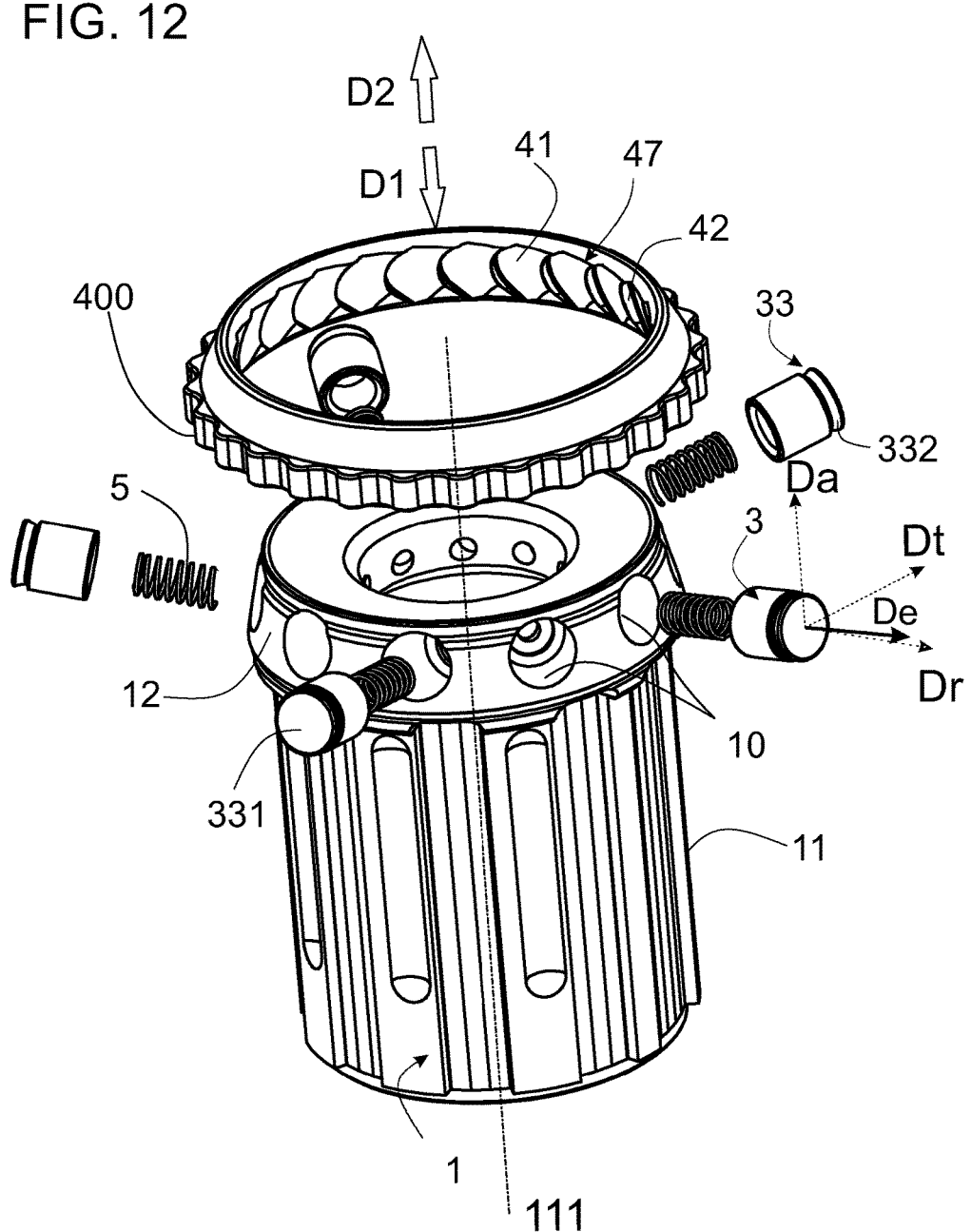
FIG. 12 shows an exploded perspective view of an alternative embodiment of the invention, where each pawl's engage member (33) comprises a conical shaped thrust face (332).
Figure 13:
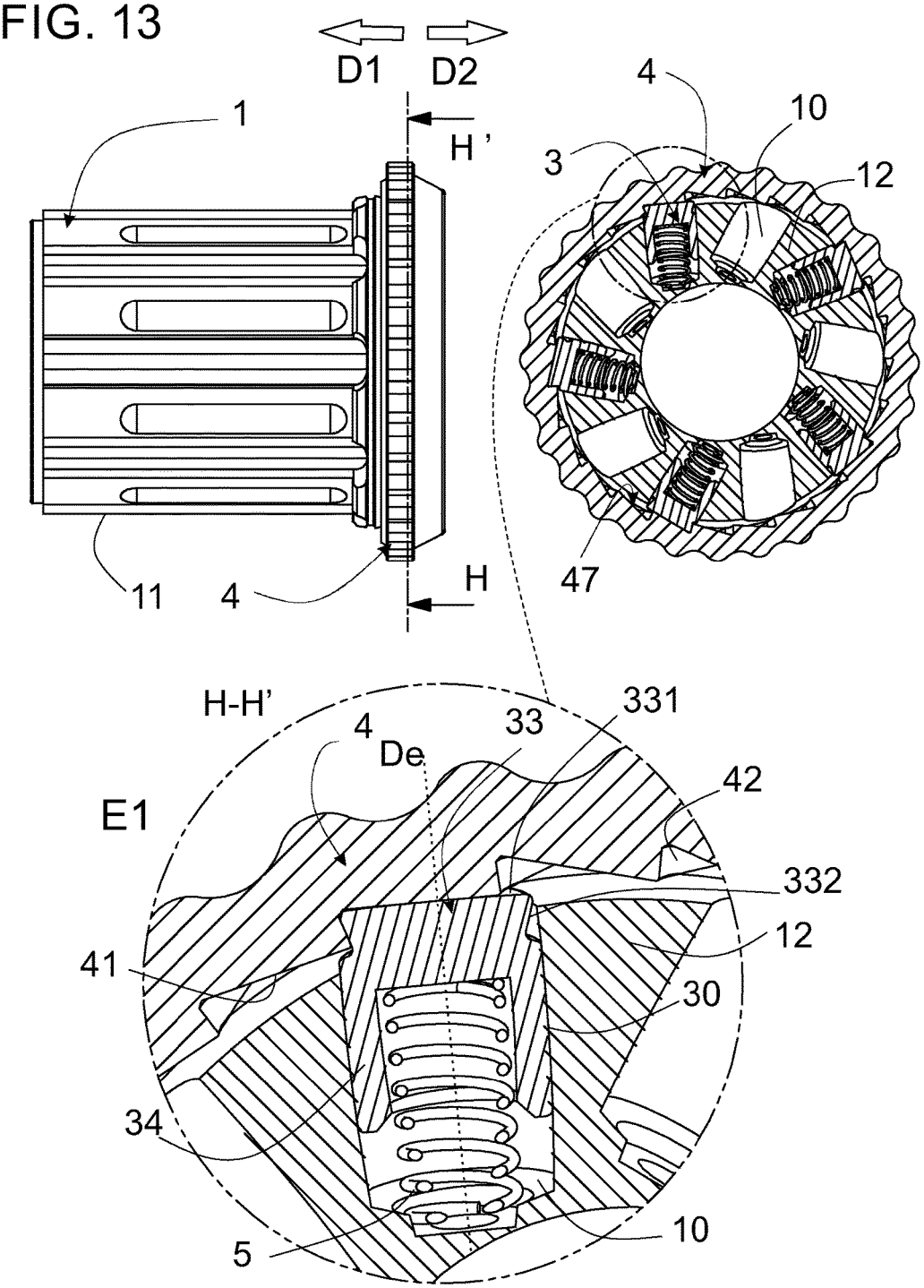
FIG. 13 shows a cross-section of the alternative embodiment of FIG.12 in the non-freewheeling state (E1), where each recess' thrust surface (41) is conical shaped to mate with the corresponding pawl's thrust face (332).
Figure 15:
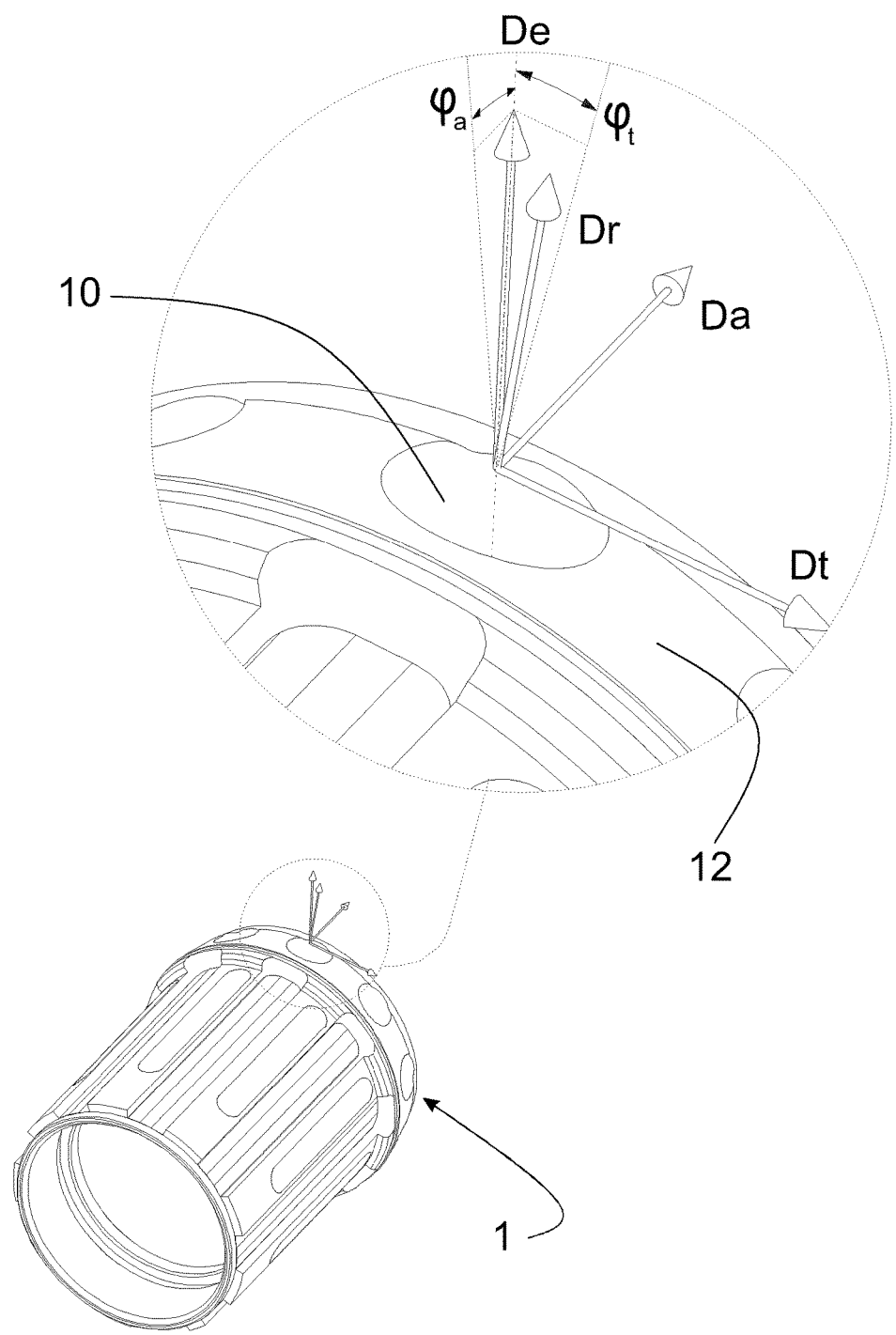
FIG. 15 shows a detail view of the local Cartesian coordinate system of FIG. 14, disclosing the tangential tilt angle ($\varphi_t$) and the axial tilt angle ($\varphi_a$).

In a preferred embodiment of the mechanism object of the invention, it is proposed a bicycle freewheel of a rear wheel hub, wherein the first carrying member (1) is the commonly called sprocket support body for engaging a sprocket assembly (9), and the second carrying member (2) is the hub shell body. The first carrying member (1) is rotatably mounted along a rotational axis (111); the second carrying member (2) is coaxial, rotatable and axially fixed regarding the first carrying member (1).

The axial direction (Da) corresponds to the rotation direction of the second carrying member (2) when freewheeling regarding the first carrying member (1). The tangential direction (Dt) corresponds to the second carrying member (2) sense of rotation when freewheeling regarding the first carrying member (1).

The toothed ring (4) is coaxial along the rotational axis (111) and non rotatably coupled to the second carrying member (2). The toothed ring (4) comprises a toothed member (47) radially disposed provided with a plurality of recesses (40) forming teeth (49) peripherally arranged and equally spaced, having a tangential slope and furthermore an axial slope.

Said first carrying member (1) comprises a drum member (12) provided with at least one longitudinal cavity (10) for housing at least one longitudinal pawl (3) arranged to engage and disengage with the toothed member (47) for respectively force the toothed ring (4) to rotate jointly or separately with the first carrying member (1).

The longitudinal axis of each longitudinal cavity (10) is predominantly radial but having an axial tilt angle ($\varphi_a$) and a tangential tilt angle ($\varphi_t$), defining an interlocking direction (De). The longitudinal pawl (3) housed in the longitudinal cavity (10), has a longitudinal axis (37) coincident with the longitudinal axis of said longitudinal cavity (10), thus allowing the sliding of the longitudinal pawl (3) into the longitudinal cavity (10), biased towards the toothed member (47) by biasing means (5).

The longitudinal pawl (3) comprises in one end an engage member (33), which faces outwardly from the longitudinal cavity (10) in order to come into contact with the toothed member (47). This engage member comprises a slip face (331) orthogonal to the pawl longitudinal axis (37) and a thrust face (332), laterally disposed. Said slip face (331) is configured to slide contacting the toothed member (47) when freewheeling, and said thrust face (332) is configured to push on the recesses (40) of the toothed member (47) for transmitting torque between the first and the second carrying members (1, 2) when non freewheeling.

Said second carrying member (2) comprises a first torque load transmitting member (200) mating with a second torque load transmitting member (400) provided in the toothed ring (4), that force the second carrying member (2) and the toothed ring (4) to always rotate jointly. The first torque load transmitting member (200) and the second torque load transmitting member (400) allow bidirectional movement of the toothed ring (4) in the axial direction (Da), being declutching the axial movement from a first clutch position, corresponding to non-freewheeling, to a second declutch position, corresponding to freewheeling, and being clutching the axial movement of the toothed ring (4) from the second declutch position to the first clutch position, and being both opposite movements always forced by at least one longitudinal pawl (3), which engage member (33), via its slip face (331), bias the toothed ring (4) in the axial direction (Da) away from the drum member (12), and, via its thrust face (332), axially guides the toothed ring (4) screwing towards the drum member (12) when torque is applied and the engage member (33) engages with one of the recesses (40) till the engage member (33) is fully meshed at the bottom of the recess (40).

Both main members (1 and 2) are coaxial and rotatably mounted by bearing assemblies (81, 82) to a non-rotatable hub axle (7), but axially fixed via an axle assembly (7) in a well-known way in the prior art. This axle assembly (7), that is stationary on bicycles, comprises different elements (70, 71, 72, 73, 74) and two pairs of bearing assemblies (81, 82) in order to axially position both carrying members (1, 2) limiting the axial distance between them.

Said first carrying member (1) further comprises an outer peripheral surface provided with external engaging means (100) arranged as a grooved profile mating with the corresponding internal engaging means (900) arranged in the sprocket assembly (9).

In this preferred embodiment, the longitudinal pawls (3) attack the toothed ring (4) from the inside in an interlocking direction (De) mostly radial, but with certain tangential and axial tilt angle. Said tangential tilt is negative, i.e. in the tangential negative direction, being the tangential tilt angle ($\varphi_t$), the angle formed between the radial direction (Dr) and the projection of the interlocking direction (De) on the plane orthogonal to the axial direction (Da). This tangential tilt angle ($\varphi_t$) is within the range 10°-15°, being preferably 12.5°. Thus, the toothed ring (4) has an appropriate balance between maximize the thrust surfaces (42) depth and minimize the slip surfaces (41) slope. Said maximum depth is necessary to maximize torque transfer, and said minimum slope is necessary to optimize a smooth longitudinal pawl (3) slippage that facilitate the disengagement and reduce friction and noise when freewheeling.

Said axial tilt is in the axial positive direction, being the axial tilt angle ($\varphi_a$), the angle formed between the radial direction (Dr) and the projection of the interlocking direction (De) on the plane orthogonal to the tangential direction (Dt). This tangential tilt angle ($\varphi_a$) is within the range 10°-15°, being preferably 12° thus, on one hand facilitates the sliding and the clutch-declutch of the mechanism, and on the other hand greatly facilitates the toothed ring (4) manufacturability itself, for example by milling a toroidal element.

In a more preferred embodiment of the invention, each longitudinal pawl (3) is arranged as a revolving component comprising two coaxial members: a cylindrical guiding member (34) and a revolving engage member (33). The cylindrical guiding member (34) has a constant outside circular cross-section mating with the inside circular cross-section of the corresponding longitudinal cavity (10), making coincident the longitudinal pawl axis (37), with the interlocking direction (De) of said longitudinal cavity (10).

This preferred embodiment with revolving longitudinal pawls (3) has additional advantages. One of them is to facilitate the clutching, as in the clutching state (E4) the friction force between both surfaces makes each longitudinal pawl (3) to roll over the outer side surface (421), smoothing the contact between the elements until full meshing. Therefore, each longitudinal pawl (3) is turning on itself inside the corresponding longitudinal cavity (10), which is configured to guarantee coaxially positioning with the longitudinal pawl (3) in said interlocking direction (De).

Furthermore, each engage member (33) comprises a slip face (331) slightly domed and convex, to facilitate the slippage at all times when contacting with the slip surfaces (41) of the recesses (40) of the toothed ring (4). Each longitudinal pawl (3) is forced in the interlocking direction (De), towards the toothed ring (4) by action of biasing means (5) arranged as torsion springs housed inside the longitudinal cavities (10) of the first carrying member (1). In order to achieve a more compact and lightweight design, each longitudinal pawl (3) is provided, in the opposite end to the engage member (33), with a guiding member (34) comprising a hole therein, called housing hole (35), to partially contain and to guide in the interlocking direction (De) said biasing means (5).

This preferred embodiment with revolving longitudinal pawls (3) allows an easy but high-precision manufacturing, as it is possible to manufacture by milling either the longitudinal cavities (10) of the first carrying member (1), being arranged as drill holes, as the recesses (40) of the toothed ring (4). Furthermore, for manufacturing the longitudinal pawls (3) a lathe it is used. It is therefore inexpensive to industrialize.

As described above for the engaging start instant ($E4_e$), the maximum floating distance (FdM), limiting the toothed ring (4) axial sliding away from the drum member (12), must be sufficiently small, being preferably under 25% of the engage member (3) maximum transversal dimension or diameter, and more preferably within the range 10%-20%. In this preferred embodiment the maximum floating distance (FdM) is 13.7% of the engage member (3) maximum diameter, ensuring that the outer side surface (421) of the respective recess (40) comes into contact with the thrust face (332) of the engage member (33).

Furthermore in this particular embodiment, the second carrying member (2), that engage the toothed ring (4) via the first torque load transmitting member (200) mating with the corresponding second torque load transmitting member (400) of the toothed ring (4), also comprises an axial restriction member (21) arranged at the bottom of the toothed ring housing (20) in the second carrying member (2).

In a preferred embodiment, the first carrying member (1) comprises a tubular member (11), in which outer peripheral surface are provided the external engaging means (100) for engaging the sprocket assembly (9), and a drum member (12) adjacent to the toothed ring (4) provided with an outer surface (120) conical frustum shaped, whose diameter decreases in the positive axial direction (Da). In this outer surface (120) of the drum member (12) are peripherally disposed the openings of the abovementioned longitudinal cavities (10) for housing and guiding the longitudinal pawls (3).

According to that, in this embodiment, the toothed ring (4) is annular shaped with an inner opening (45) mating with said outer surface (120) of the drum member (12) in order to allow a housing with radial play between the toothed ring (4) and the drum member (12). Said inner opening (45) further comprises in the contact area with the longitudinal pawls (3), a revolution surface (46) relating the rotational axis (111), which radial dimension decreases in the positive axial direction (Da) in order to facilitate the clutching and declutching of the mechanism. Furthermore, said revolution surface (46) is provided with N1 recesses (40) forming teeth (49) equally angular spaced. Due to abovementioned geometry of the revolution surface (46), the outer side edge (4211) ends approximately in the middle of the slip surface (41) of the corresponding recess (40).

Figure 16:
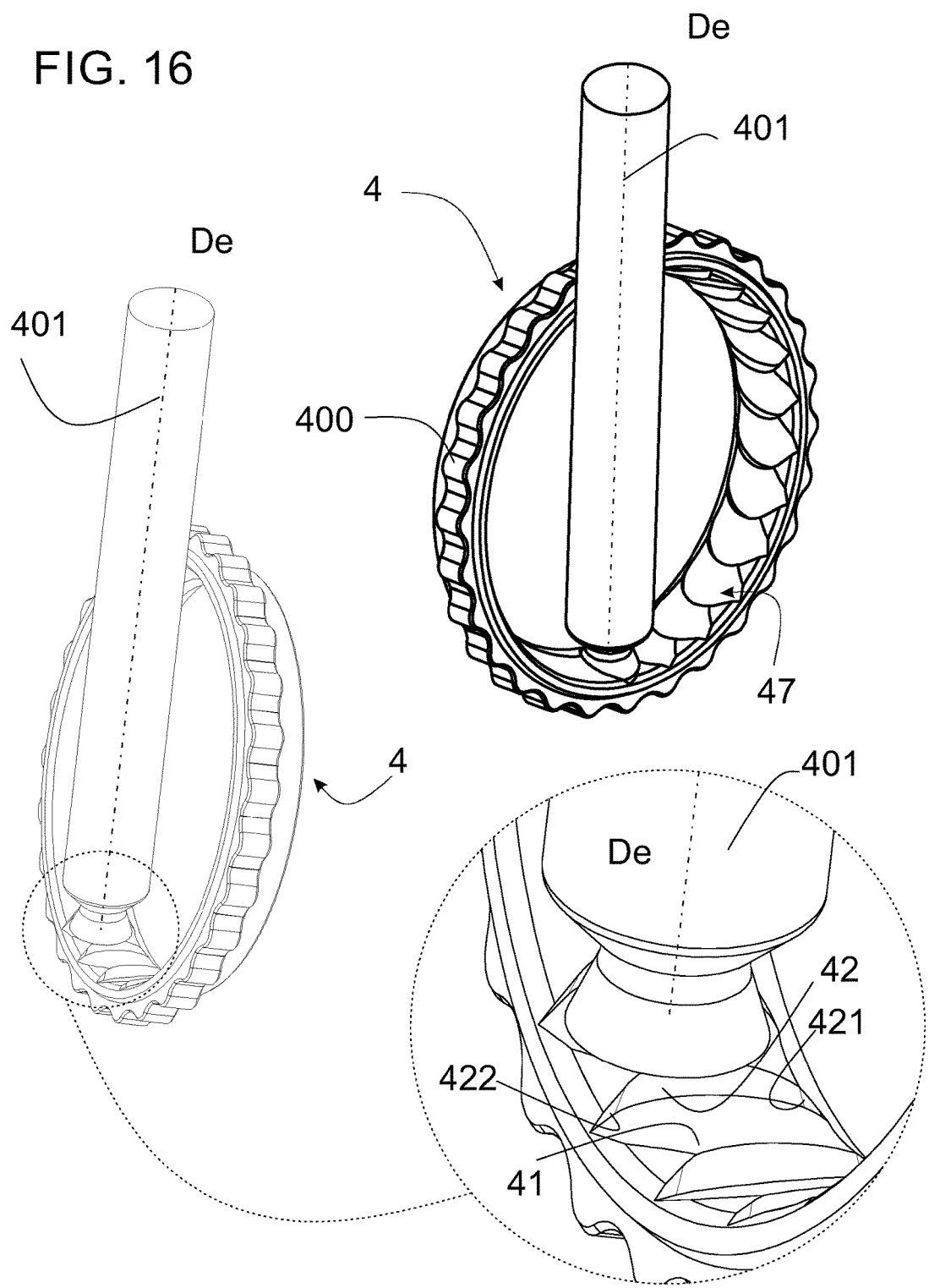
FIG.16 shows a simulation of the milling process of the multiples recesses (40) on the toothed ring (4) via a milling cutter (401), to better appreciate the surfaces forming each recess (40).

The machining process of each recess (40), as shown in FIGS. 16 and 17, is preferably milling with constant depth, so that each slip surface (41) is flat shaped and sloping an axial tilt angle ($\varphi_a$) and a tangential tilt angle ($\varphi_t$); and the thrust surface (42) is curved and concave viewed from the longitudinal pawl (3). Furthermore, the teeth (49) of the toothed ring (4) are executed with a peak section so that consecutive recesses (40) are overlapped and each slip surface (41) of one recess (40) ends in the thrust surface (42) of the next recess (40) in the freewheeling rotation.

In a preferred embodiment, each engage member (33) is partially enclosed by the thrust surface (42) of the meshed recess (40) when non-freewheeling state (E1). Therefore the thrust surface (42) and the engage member (33) cross-sections mates being partially coincident, and it is defined a longitudinal axis of the thrust surface (42) mating with the longitudinal axis of the engage member (33), coincident with the interlocking direction (De) of the corresponding longitudinal cavity (10).

In an alternative embodiment of the invention, consecutive recesses (40) are non-overlapped, as N1 is small enough providing greater angular separation between consecutive recesses (40). As a consequence, teeth (49) of the toothed ring (4) are flattened and plateau shaped; and the surfaces of the toothed ring (4) connecting consecutive recesses (40) work as an extension of the slip surfaces (41).

In a preferred embodiment, the first torque load transmitting member (200) is arranged in an inner peripheral surface of the second carrying member (2) mating with the second torque load transmitting member (400) arranged in an outer peripheral surface of the toothed ring (4) housed therein. Both first torque load transmitting member (200) and second torque load transmitting member (400) are arranged as axially extending profiles parallel to the rotational axis (111), provided with recesses and protrusions peripherally disposed extending in the axial direction (Da) in the contact areas, for non-rotatably engaging the toothed ring (4) and the second carrying member (2). Furthermore, the dimension along the axial direction (Da) of the first torque load transmitting member (200) is greater than the corresponding axial dimension of the second torque load transmitting member (400), allowing the axial displacement of the toothed ring (4) in the axial direction (Da), the axial restriction member (21) is provided in the second carrying member (2), for axially limiting the toothed ring (4) sliding, when the axial restriction member (21) contacts with the toothed ring (4) via an axial abutment member (43).

In a preferred embodiment of the invention, the inner side surface (422) of each recess (40) forms a lateral ramp inclined at an angle of 12° with respect to the tangential direction (Dt), thus closing the outlet opening of the recess (40). So, when declutching, as the toothed ring (4) rotates forward in the tangential direction, the inner side surface (422) becomes a guiding ramp which in case of contact with the thrust face (332) of the engage member (33), forces the toothed ring (4) to move axially in the declutching direction (D2) away from the drum member (12) and getting closer to the axial restriction member (21).

In another preferred embodiment of the invention, the outer side surface (421) of each recess (40) forms a lateral ramp inclined at an acute slope with respect to the tangential direction (Dt), preferably of 45°, thus opening the inlet opening of the recess (40). So, when clutching, as the toothed ring (4) rotates backward in the negative tangential direction (Dt), the outer side surface (421) becomes a guiding ramp which supports the thrust face (332) of the engage member (33), thus axially forcing to move the toothed ring (4) in the clutching direction (D1) towards the drum member (12). Said acute slope defines the engaging start instant (E4$_e$), when begins the effect of screwing that axially forces the toothed ring (4) to slide, distancing from the axial restriction member (21).

As happens in other prior art freewheel mechanisms, in order to guarantee the correct operation, the number N1 of recesses (40) must has a balance working value: small enough to maximize the depth of the thrust surface (42) to allow proper meshing and torque transmission required when non-freewheeling, but large enough to minimize the angular separation between consecutive recesses (40).

The first carrying member (1) comprises N2 longitudinal cavities (10) whose function is to house N3 revolving longitudinal pawls (3).

There are multiple working combinations for the freewheel mechanism object of the invention, with different values for N1, N2 and N3, according to different requirements relating to minimum dead angle, maximum torque to be transmitted, minimum weight, desired noise when freewheeling, etc. Thus, the following preferred values for N1, N2, and N3 are proposed:

In a preferred embodiment, N2>N3, and N3 and N2 are N1 divisors, thus providing additional advantages: first, to reduce the first carrying member (1) weight, while facilitating maintenance operations as it is provided with a number of extra alternatives longitudinal cavities (10) ready for using when wear limits the work life; and second, to have the option for increasing the load transfer capacity by adding additional longitudinal pawls (3) simultaneous meshing, to maximum N3=N2. Citing as two more preferred examples:

(N1=36, N2=12, N3=6): Resulting Dead Angle=360/N1=10°

(N1=30, N2=10, N3=5): Resulting Dead Angle=12°

In another preferred embodiment, N2=N3, and N3 and N2 are N1 divisors:

(N1=30, N2=6, N3=6): Resulting Dead Angle=12°

In an alternative preferred embodiment, N2>N3, N3 is N1 divisor, N3 is N2 divisor, but N2 is non divisor N1, providing another advantages: first, to reduce the first carrying member (1) weight, while facilitating maintenance operations as it is provided with a number of extra alternatives longitudinal cavities (10) ready for using when wear limits the work life; and second, to have the option for decreasing the dead angle by adding additional longitudinal pawls (3) simultaneous meshing, to maximum N3=N2. Citing as a more preferred example:

(N1=25, N2=10, N3=5): Resulting Dead Angle=14.4°

In another preferred embodiment, N2=N3, and N3 is N1 divisor, N3 is N2 divisor, but N2 is non divisor N1:

(N1=25, N2=10, N3=10): Resulting Dead Angle=7.2°

So in this embodiment, as there are only 5 longitudinal pawls (3) meshing at the same time, the second group of 5 are in half a way for the next engagement position, resulting the 50% dead angle than in the previous case.

In the specific application of the present invention to a bicycle freewheel mechanism, it must be outlined the ease in dismantling and maintenance, solving the existing disassembly problem in Prior Art bicycle hubs. In these known mechanisms, once the toothed ring is screwed into the hub shell, is hardly removable, due to the tooth slip surface geometry. In this known mechanisms screwing is easy taking advantage of the thrust surfaces of the recess, but disassembly is almost impossible because this operation requires leaning a tool on the slip surface of said recess, does not allowing to support said tool adequately.

However, in the case of the mechanism of the invention, the toothed ring (4), housed in the hub shell body or second carrying member (2), needs no tool for removal. In order to access inside the second carrying member (2) for making maintenance operations, such as removing bearing assemblies, you only need to remove the second end cap (71), thus allowing free access to the second carrying member (2) or hub shell body, while the toothed ring (4), the longitudinal pawls (3) and first carrying member (1) remain assembled together, which greatly facilitates the handling assembly.

Alternative Embodiments

In an alternative embodiment of the present invention, the revolving longitudinal pawl (3) is externally shaped as a cylinder, so the lateral face (30) of the guiding member (34) and the thrust face (332) of the engage member (33) are comprised in the same cylindrical surface. Therefore, in the corresponding toothed ring (4) of this embodiment, the slip surface (41) of each recess (40) is substantially orthogonal to the thrust surface (42) generators in each recess (40), being this generators parallel to the interlocking direction (De) corresponding to an engage member (33) engaged in said recess (40) when non-freewheeling; so that the thrust surface (42) secure the tangential support of the corresponding engage member (33).

In a preferred alternative embodiment of the present invention, the engage member (33) shape is optimized in order to avoid wearing and to extend the mechanism life span. In this case, the thrust face (332) of the engage member (33) is preferred conical shaped with increasing radial dimension towards the slip face (331). In order to allow the engagement and disengagement between longitudinal pawls (3) and toothed ring (4), each thrust surface (42) is as well conical shaped, forming an acute angle with the slip surface (41) of the corresponding recess (40), and mating with the abovementioned thrust face (332) provided in the engage member (33). This latter conical embodiment of the engage member (33) prevents a partial engagement of any engage member (33) in a recess (40), thus preventing any torque transmission between the tips of the tooth (49) and the tips of the engage member (33), extending the mechanism life span.

In the abovementioned cylindrical embodiment of the engage member (33), said partial engagement could happen when the N3 longitudinal pawls (3) do not engage all at once, so at least one of said engage members (33) stays aligned with 10 the thrust surface (42) of the recess (40) but still contacting the slip surface (41) of the preceding recess (40), therefore producing the contact between tips of the tooth (49) and tips of the engage member (33).

In the other hand, in the present conical embodiment of the engage member (33), said partial engagement cannot happen, because even in case the N3 longitudinal pawls (3) do not engage all at once, the non-engaged engage member (33) stays on the preceding recess (40) contacting the slip surface (41) but not the thrust surface (42).

Moreover, in this conical embodiment, the slip face (331) remains orthogonal to the longitudinal axis of the longitudinal pawl (3), and remains preferred slightly domed and convex, to facilitate the slippage at all times when contacting with the slip surface (41) of each recess (40).

In a more preferred embodiment, the engage member (33) further comprises a connecting face (333) connecting the thrust face (332) with the guiding member (34).

In another alternative embodiment, the guiding member (34) of each longitudinal pawl (3) is prism-shaped with a constant outside polygonal cross-section mating with the inside cross-section of the corresponding longitudinal cavity (10) which is at least provided with two parallel faces.

In another alternative embodiment of the invention, the toothed ring (4) is outwardly toothed, which recesses (40) are in the outer peripheral area of said toothed ring (4), so that the longitudinal pawls (3) attack in an interlocking direction (De) with decreasing radial component, instead of increasing as described above in the preferred embodiment. This configuration, in a more preferred embodiment in which the toothed ring (4) has guided floatability, can be particularly arranged with an interlocking direction (De) with no axial component, which may be relevant in applications in which minimum axial dimension for the mechanism is required.

Another alternative embodiment of the invention is a freewheel mechanism fully declutchable, instead of partially declutchable as abovementioned in the present application. In order to achieve that, the axial restriction member (21) that limits the toothed ring (4) axial floatability, is provided in an external member different from both carrying members (1, 2) Said axial restriction member (21) can be range at least between two different and predetermined axial positions, via existing means, manually prescribed by the user:

A position corresponding to the Maximum Floating distance (FdM) which means a partial disengagement and allows re-mesh when a non-freewheel rotation is produced, according to the abovementioned;

A second position in which the axial sliding of the toothed ring (4) exceeds the Maximum Floating distance (FdM) value leading to the complete disengagement, a declutched position, in which both carrying members rotate independently regardless of the direction of rotation.

Another alternative embodiment of the invention, is a freewheel in which the axially fixed and predetermined distance between both carrying members (1, 2) can be previously selected by the user, at least between two alternative positions, by separating or approaching both carrying members (1, 2) via existing means:

A position corresponding to the Maximum Floating distance (FdM) which means a partial disengagement and allows re-mesh when a non-freewheel rotation is produced, according to the above mentioned in the application;

A second position in which the axial floatability of the toothed ring (4) exceeds the Maximum Floating distance (FdM) value leading to the complete disengagement.

Mechanical applications of the present freewheel invention are multiple and applicable to different technical fields, as an alternative to the well-known "one-way bearing" mechanisms for unidirectional transmission, and other conventional freewheels. Thus, the description of a particular application of the present invention in bicycle hubs is provided for illustration only, and not for the purpose of limiting the invention.

The invention claimed is:

1. A freewheel mechanism comprising:
a first carrying member (1) rotatably mounted along a rotational axis (111);
a second carrying member (2) coaxial, rotatable and axially fixed regarding the first carrying member (1), wherein an axial direction (Da) corresponds to rotation direction of the second carrying member (2) when freewheeling regarding the first carrying member (1), therefore a tangential direction (Dt) corresponds to the second carrying member (2) sense of rotation when freewheeling regarding the first carrying member (1);
a toothed ring (4) coaxial along the rotational axis (111), non rotatably coupled to the second carrying member (2), and comprising a toothed member (47) radially disposed provided with a plurality of recesses (40) forming teeth (49) peripherally arranged and equally spaced, having a tangential slope and furthermore an axial slope;
said first carrying member (1) comprises a drum member (12) provided with at least one longitudinal cavity (10) for housing at least one longitudinal pawl (3) arranged to engage and disengage with the toothed member (47) for respectively force the toothed ring (4) to rotate jointly or separately with the first carrying member (1), wherein the longitudinal axis of each longitudinal cavity (10) is predominantly radial but having an axial tilt angle (cpa) and a tangential tilt angle (cpt), defining an interlocking direction (De);
wherein the longitudinal pawl (3) housed in the longitudinal cavity (10), has a longitudinal axis (37) coincident with the longitudinal axis of said longitudinal cavity (10), thus allowing the sliding of the longitudinal pawl (3) into the longitudinal cavity (10), biased towards the toothed member (47) by biasing means (5);
wherein the longitudinal pawl (3) comprises in one end an engage member (33), which faces outwardly from the longitudinal cavity (10) in order to come into contact with the toothed member (47), the engage member comprising a slip face (331) orthogonal to the pawl longitudinal axis (37) and a thrust face (332), laterally disposed;
wherein said slip face (331) is configured to slide contacting the toothed member (47) when freewheeling, and said thrust face (332) is configured to push on the recesses (40) of the toothed member (47) for transmitting torque between the first and the second carrying members (1, 2) when non freewheeling;
wherein said second carrying member (2) comprises a first torque load transmitting member (200) mating with a second torque load transmitting member (400) provided in the toothed ring (4), that force the second carrying member (2) and the toothed ring (4) to always rotate jointly;
characterized in that the first torque load transmitting member (200) and the second torque load transmitting member (400) allow bidirectional movement of the toothed ring (4) in the axial direction (Da), being declutching the axial movement from a first clutch position, corresponding to non-freewheeling, to a second declutch position, corresponding to freewheeling, and being clutching the axial movement of the toothed ring (4) from the second declutch position to the first clutch position, and being both opposite movements always forced by at least one longitudinal pawl (3), which engage member (33), via its slip face (331), biases the toothed ring (4) in the axial direction (Da) away from the drum member (12), and, via its thrust face (332), axially guides the toothed ring (4) screwing towards the drum member (12) when torque is applied and the engage member (33) engages with one of the recesses (40) till the engage member (33) is fully meshed at the bottom of the recess (40).

2. A freewheel mechanism according to claim 1, wherein the longitudinal pawl (3) further comprises a guiding member (34) which has an outer cross-section mating the inner cross-section of the longitudinal cavities (10), allowing the longitudinal pawl (3) to slide along the interlocking direction (De) of the corresponding cavity (10) that houses it.

3. A freewheel mechanism according to claim 1, wherein the first torque load transmitting member (200) and the second torque load transmitting member (400) are arranged as profiles with recesses and protrusions peripherally disposed extending in the axial direction (Da) being the dimension along the axial direction (Da) of the first torque load transmitting member (200) greater than the corresponding axial dimension of the second torque load transmitting member (400), allowing the axial displacement of the toothed ring (4) in the axial direction (Da).

4. A freewheel mechanism according to claim 1, wherein the first clutch position corresponding to non-freewheeling is when at least one longitudinal pawl (3) is engaged with the toothed member (47) forcing both carrying members (1, 2) to rotate jointly transmitting torque between them, and the second declutch position is determined by the contact between an axial abutment member (43) of the toothed ring (4) with an axial restriction member (21) arranged in the second carrying member (2), being the axial distance between every instantaneous position of the toothed ring (4) and the first clutch position the floating distance (Fd) and therefore the second declutch position corresponds to the maximum floating distance (FdM).

5. A freewheel mechanism according to claim 4, wherein said maximum floating distance (FdM), limiting the toothed ring (4) axial sliding away from the drum member (12), is sufficiently small, being under 25% of the engage member (3) maximum transversal dimension.

6. A freewheel mechanism according to claim 5, wherein said maximum floating distance (FdM) is within the range 10%-20% of the engage member (3) maximum transversal dimension.

7. A freewheel mechanism according to claim 1, wherein each recess (40) comprises a slip surface (41) located at the bottom of the recess (40) and a lateral surface (44) concave according the tangential direction (Dt).

8. A freewheel mechanism according to claim 7, wherein the slip surface (41) of each recess (40) is substantially orthogonal to the interlocking direction (De) of the corresponding longitudinal pawl (3) engaged in said recess (40) when non-freewheeling.

9. A freewheel mechanism according to claim 7, wherein this lateral surface (44) comprises a thrust surface (42) delimiting the slip surface (41) in the positive tangential direction (Dt), an outer side surface (421) and an inner side surface (422), both latter flanking the thrust surface (42) in the axial direction (Da), being positioned the inner side surface (422) in the increasing axial direction (Da), being the outer side surface (421) radially delimited between the slip surface (41) and an outer side edge (4211).

10. A freewheel mechanism according to claim 9, wherein the thrust surface (42) mates with the thrust face (332) of the corresponding engage member (33).

11. A freewheel mechanism according to claim 10, wherein in the non-freewheeling state (E1), each engage member (33) is fully meshed at the bottom of a thrust surface (42) being partially enclosed by said thrust surface (42) and supported in the tangential direction (Dt) of the meshed recess (40), and wherein the slip face (331) is in contact with the slip surface (41) of said meshed recess (40).

12. A freewheel mechanism according to claim 11, wherein the slip face (331) is slightly convex in the interlocking direction (De) to facilitate the slippage when contacting with the slip surface (41) of each recess (40).

13. A freewheel mechanism according to claim 1, wherein the longitudinal pawls (3) are revolving components comprising a guiding member (34) with circular cross-section.

14. A freewheel mechanism according to claim 13, wherein the inner side surface (422) of each recess (40) is lateral ramp shaped with respect to the tangential direction (Dt), so when declutching, as the toothed ring (4) rotates forward in the tangential direction (Dt), the inner side surface (422) becomes a guiding ramp which contacts with the thrust face (332), forcing the toothed ring (4) to move axially away from the drum member (12).

15. A freewheel mechanism according to claim 14, characterized in that the inner side surface (422) of each recess (40) forms a lateral ramp inclined at an angle of 12° with respect to the tangential direction (Dt).

16. A freewheel mechanism according to claim 13, characterized in that the outer side surface (421) of each recess (40) forms a lateral ramp inclined at an acute slope with respect to the tangential direction (Dt), so when clutching, as the toothed ring (4) rotates backward, in negative tangential direction (Dt), the outer side surface (421) becomes a guiding ramp which supports the thrust face (332), forcing the toothed ring (4) to move axially towards the drum member (12).

17. A freewheel mechanism according to claim 16, characterized in that the outer side surface (421) of each recess (40) forms a lateral ramp inclined at an angle of 45° with respect to the tangential direction (Dt).

18. A freewheel mechanism according to claim 1, wherein the interlocking direction (De) has a tangential tilt angle (cpt) within the range 10°-15°, being the angle formed between the radial direction (Dr) and the projection of the interlocking direction (De) on the plane orthogonal to the axial direction (Da).

19. A freewheel mechanism according to claim 1, wherein the interlocking direction (De) has an axial tilt angle (pa) within the range 10°-15°, being the angle formed between the radial direction (Dr) and the projection of the interlocking direction (De) on the plane orthogonal to the tangential direction (Dt).

* * * * *